United States Patent
Liu et al.

(10) Patent No.: US 12,516,433 B2
(45) Date of Patent: Jan. 6, 2026

(54) MIXED SODIUM AND LITHIUM PERIOD FOUR TRANSITION METAL OXIDES FOR ELECTROCHEMICAL LITHIUM EXTRACTION

(71) Applicant: THE UNIVERSITY OF CHICAGO, Chicago, IL (US)

(72) Inventors: Chong Liu, Chicago, IL (US); Grant T. Hill, Chicago, IL (US)

(73) Assignee: The University of Chicago, Chicago, IL (US)

( * ) Notice: Subject to any disclaimer, the term of this patent is extended or adjusted under 35 U.S.C. 154(b) by 562 days.

(21) Appl. No.: 18/044,137

(22) PCT Filed: Feb. 1, 2022

(86) PCT No.: PCT/US2022/014682
§ 371 (c)(1),
(2) Date: Mar. 6, 2023

(87) PCT Pub. No.: WO2022/169737
PCT Pub. Date: Aug. 11, 2022

(65) Prior Publication Data
US 2023/0323552 A1 Oct. 12, 2023

Related U.S. Application Data

(60) Provisional application No. 63/144,816, filed on Feb. 2, 2021.

(51) Int. Cl.
*C25B 9/17* (2021.01)
*C25B 11/00* (2021.01)
(Continued)

(52) U.S. Cl.
CPC . *C25C 7/02* (2013.01); *C25C 1/02* (2013.01)

(58) Field of Classification Search
CPC ......... C25B 9/17; C25B 11/00; C25B 11/052; C25B 11/054; C25C 7/02; C25C 1/02
See application file for complete search history.

(56) References Cited

U.S. PATENT DOCUMENTS 9,331,274 B2 5/2016 Moradpour et al.
2004/0016632 A1* 1/2004 Barker ................. B01J 19/12
204/157.4
(Continued)

FOREIGN PATENT DOCUMENTS

JP 2013-546195 A 12/2013
WO WO 2020/069618 A1 4/2020

OTHER PUBLICATIONS

R. Berthelot et al., "Synthesis and Investigations on an O4—LiCoO2 Polytype," *Electrochemical and Solid-State Letters*, 12 (11); pp. A207-A210 (Aug. 20, 2009).

(Continued)

*Primary Examiner* — Zulmariam Mendez
(74) *Attorney, Agent, or Firm* — Bell & Manning, LLC

(57) ABSTRACT

Layered Period Four transition metal oxide materials composed of lithium transition metal oxides and sodium transition metal oxides, in which the transition metal oxide is cobalt, manganese, nickel, or a combination of two or more thereof or provided. Also provided are electrochemical cells incorporating the layered transition metal oxides as electrode materials and methods for extracting dissolved lithium from solution using the electrochemical cells. In the materials a lithium transition metal oxide phase and a sodium transition metal oxide phase exist as separate phases connected by a transition region of intermediate composition and layer spacing to form a stable structure.

17 Claims, 25 Drawing Sheets

(51) Int. Cl.
    C25B 11/052    (2021.01)
    C25B 11/054    (2021.01)
    C25C 1/02      (2006.01)
    C25C 7/02      (2006.01)

(56)         References Cited

U.S. PATENT DOCUMENTS

2004/0197654 A1*  10/2004  Barker ............... H01M 4/13
                                                   429/231.95
2019/0148711 A1    5/2019  Jo et al.
2023/0282800 A1    9/2023  Liu et al.

OTHER PUBLICATIONS

Hill et al., "Layer spacing gradient (NaLi)1xCoO2 for electrochemical Li extraction," Matter (May 5, 2021) 4, 1-14. https://doi.org/10.1016/j.matt.2021.02.005.
Merryweather, Alice J., et al. "Operando optical tracking of single-particle ion dynamics and phase transitions in battery electrodes." *arXiv preprint arXiv:2011.10537* (2020).
Mendiboure, A., C. Delmas, and P. Hagenmuller. "New layered structure obtained by electrochemical deintercalation of the metastable LiCoO2 (O2) variety." *Materials research bulletin* 19.10 (1984): 1383-1392.
Heubner, Christian, et al. "Insights into the electrochemical Li/Na-exchange in layered LiCoO2 cathode material." *Energy Storage Materials* 27 (2020): 377-386.
Xiao, Biwei, et al. "Revealing the atomic origin of heterogeneous Li-ion diffusion by probing Na." *Advanced Materials* 31.29 (2019): 1805889.
Chong Liu et al., "Lithium Extraction from Seawater through Pulsed Electrochemical Intercalation," *Joule* 4, 1-11 (Jul. 15, 2020). https://doi.org/10.1016/j.joule.2020.05.017.
Sifani Zavahir et al., "A review on lithium recovery using electrochemical capturing systems," *Desalination* 500 (2021) 114883; pp. 1-31.
J. M. Paulsen et al., "O2 Structure Li2/3[Ni1/3Mn2/3]O2: A New Layered Cathode Material for Rechargeable Lithium Batteries," *Journal of the Electrochemical Society*, 147 (3) 861-868 (2000).
Armstrong, A. Robert, and Peter G. Bruce. "Synthesis of layered LiMnO2 as an electrode for rechargeable lithium batteries." *Nature* 381.6582 (Jun. 6, 1996): 499-500.
The International Search Report and the Written Opinion issued on May 4, 2022 for international patent application No. PCT/US2022/014682; pp. 1-8.
Li et al., "Hydrothermal synthesis of uniform nanosized lithium-rich cathode material Lio.94(Li0. 14Nio.26Mn0.60]O2 for high power lithium-ion batteries," *Micro & Nano Letters*, 2014, vol. 9, Iss. 1, pp. 19-23. Doi: 10.1049/mnl.2013.0613.
Kanoh, Hirofumi, et al. "Selective electroinsertion of lithium ions into a platinum/. lambda.-manganese dioxide electrode in the aqueous phase." *Langmuir* 7.9 (1991): 1841-1842.
Trócoli, Rafael, Collins Erinmwingbovo, and Fabio La Mantia. "Optimized Lithium Recovery from Brines by using an Electrochemical Ion-Pumping Process Based on λ-MnO2 and Nickel Hexacyanoferrate." *ChemElectroChem* 4.1 (2017): 143-149.
Lawagon, Chosel P., et al. "Li1-xNi0. 33Co1/3Mn1/3O2/Ag for electrochemical lithium recovery from brine." *Chemical Engineering Journal* 348 (2018): 1000-1011.
Mizushima, K. J. P. C., et al. "LixCoO2 (0< x<-1): A new cathode material for batteries of high energy density." *Materials Research Bulletin* 15.6 (1980): 783-789.
Alberto Battistel et al., "Electrochemical Methods for Lithium Recovery: A Comprehensive and Critical Review," *Adv. Mater.* 2020, 32, 1905440 (1 of 23).
R. Berthelot et al., "Electrochemical investigation of the P2-NaxCoO2 phase diagram," *Nature Materials*, vol. 10, Jan. 2011; pp. 74-80.
Jia-Yan Luo et al., "Raising the cycling stability of aqueous lithium-ion batteries by eliminating oxygen in the electrolyte," *Nature Chemistry*, vol. 2, Sep. 2010; pp. 760-765. DOI: 10.1038/nchem.763.
Shyue Ping Ong et al., "Voltage, stability and diffusion barrier differences between sodium-ion and lithium-ion intercalation materials," *Energy & Environmental Science*, 2011, 4, 3680-3688.
Mauro Pasta et al., "Batteries for lithium recovery from brines †," *Energy Environ. Sci.*, 2012, 5, 9487-9491.
Jan N. Reimers et al., "Electrochemical and In Situ X-Ray Diffraction Studies of Lithium Intercalation in LixCoO2," *Journal of the Electrochemical Society*, Aug. 1992; vol. 139, Issue 8; pp. 2091-2097. Doi: 10.1149/1.2221184.
Riccardo Ruffo et al., "Electrochemical behavior of LiCoO2 as aqueous lithium-ion battery electrodes," *Electrochemistry Communications* 11 (2009); pp. 247-249.
A. Van der Ven et al., "Lithium diffusion mechanisms in layered intercalation compounds," *Journal of Power Sources* 97-98 (2001) 529-531.
Sixie Yang et al., "Lithium Metal Extraction from Seawater," *Joule* 2, 1648-1651, Sep. 19, 2018.
Delmas, C., Braconnier, J.-J. & Hagenmuller, P. A new variety of LiCoO2 with an unusual oxygen packing obtained by exchange reaction. *Mater. Res. Bull.* 17, 117-123 (1982).
Carlier, D. et al., "On the metastable O2-type LiCoO2," *Solid State Ion.* 144, 263-276 (2001).
Tournadre, F. et al., "On the mechanism of the P2-Na0.70CoO2→O2-LiCoO2 exchange reaction—Part I: proposition of a model to describe the P2—O2 transition," *J. Solid State Chem.* 177, 2790-2802 (2004).
Tournadre, F., Croguennec, L., Willmann, P. & Delmas, C, "On the mechanism of the P2-Na0.70CoO2→O2-LiCoO2 exchange reaction—Part II: an in situ X-ray diffraction study," *J. Solid State Chem.* 177, 2803-2809 (2004).
Capitaine, F., Gravereau, P. & Delmas, C.,"A new variety of LiMnO2 with a layered structure," *Solid State Ion.* 89, 197-202 (1996).
Paulsen, J. M., Donaberger, R. A. & Dahn, J. R., "Layered T2-, O6-, O2-, and P2-Type A2/3[M'2+1/3M4+2/3]O2 Bronzes, A=Li, Na; M'=Ni, Mg; M=Mn, Ti," *Chem. Mater.* 12, 2257-2267 (2000).
Paulsen, J. M. & Dahn, J. R. "O 2-Type Li2 / 3 [ Ni1 / 3Mn2 / 3 ] O 2: A New Layered Cathode Material for Rechargeable Lithium Batteries II. Structure, Composition, and Properties," *J. Electrochem. Soc.* 147, 2478 (2000).
Paulsen, J. M., Thomas, C. L. & Dahn, J. R., "Layered Li—Mn-Oxide with the O2 Structure: A Cathode Material for Li-Ion Cells Which Does Not Convert to Spinel," *J. Electrochem. Soc.* 146, 3560-3565 (1999).
Paulsen, J. M. & Dahn, J. R., "Studies of the layered manganese bronzes, Na2/3[Mn1-xMx]O2 with M=Co, Ni, Li, and Li2/3[Mn1-xMx]O2 prepared by ion-exchange," *Solid State Ion.* 126, 3-24 (1999).
Paulsen, J. M., Larcher, D. & Dahn, J. R., "O2 Structure Li2/3[Ni1/3Mn2/3]O2: A New Layered Cathode Material for Rechargeable Lithium Batteries III. Ion Exchange," *J. Electrochem. Soc.* 7 (2000).
Lu, Z., Donaberger, R. A., Thomas, C. L. & Dahn, J. R., "T2 and O2 Li2/3[ CoxNi1/3x/2Mn2/3-x/2]O2 Electrode Materials," *J. Electrochem. Soc.* 149, A1083 (2002).
Lu, Z. & Dahn, J. R., "The Effect of Co Substitution for Ni on the Structure and Electrochemical Behavior of T2 and O2 Structure Li2 / 3 [ Co x Ni1 / 3-x Mn2 / 3 ] O2," *J. Electrochem. Soc.* 148, A237 (2001).
Lu, Z. & Dahn, J. R., "Effects of Stacking Fault Defects on the X-ray Diffraction Patterns of T2, O2, and O6 Structure Li2/3[CoxNi1/3-xMn2/3]O2," *Chem. Mater.* 13, 2078-2083 (2001).
Kang, K., Meng, Y. S., Bréger, J., Grey, C. P. & Ceder, G., "Electrodes with High Power and High Capacity for Rechargeable Lithium Batteries," *Science* 311, 977-980 (Feb. 17, 2006).
Kim, J. et al., "Alluaudite LiMnPO 4 : a new Mn-based positive electrode for Li rechargeable batteries," *J. Mater. Chem. A* 2, 8632-8636 (2014).
Kim, J. et al. LiFePO 4 with an alluaudite crystal structure for lithium ion batteries. Energy Environ. Sci. 6, 830-834 (2013).

(56) References Cited

OTHER PUBLICATIONS

Hua, W. et al., "Li+/Na+ Ion Exchange in Layered Na2/3(Ni0.25Mn0.75)O2: A Simple and Fast Way to Synthesize O3/O2-Type Layered Oxides," *Chem. Mater.* 33, 5606-5617 (2021).

* cited by examiner

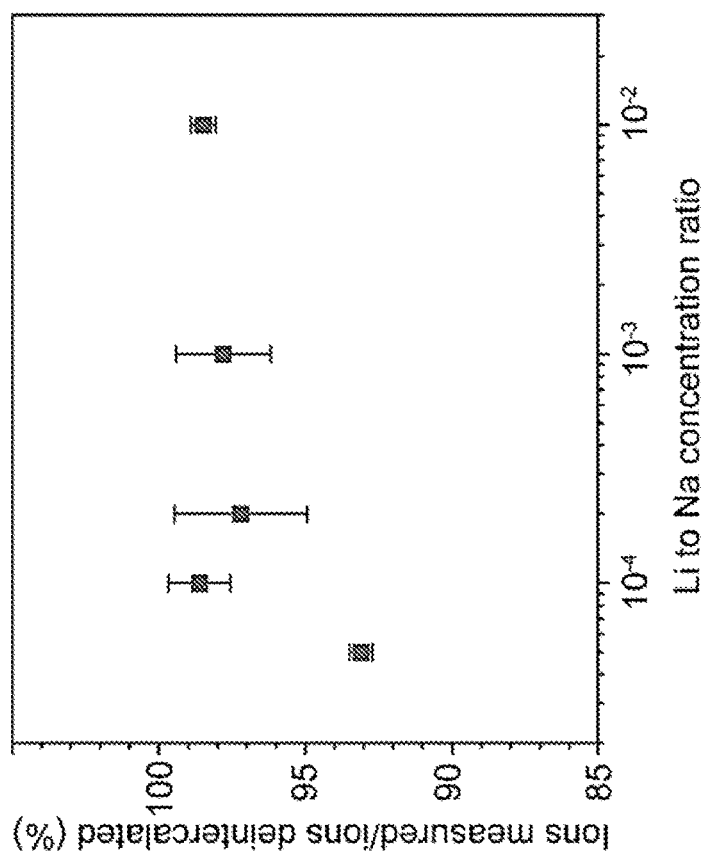
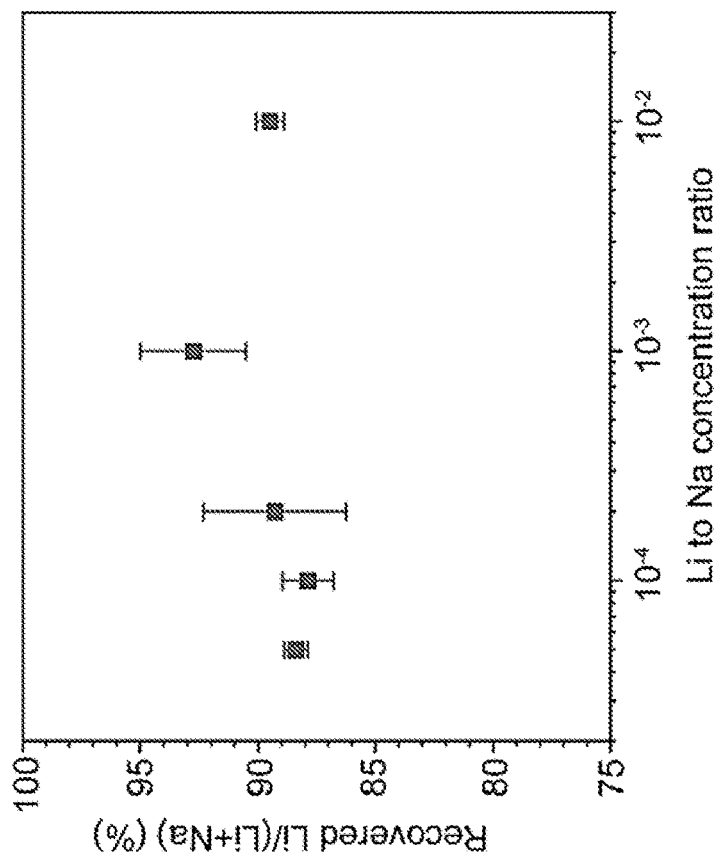
FIG. 4A
FIG. 4B

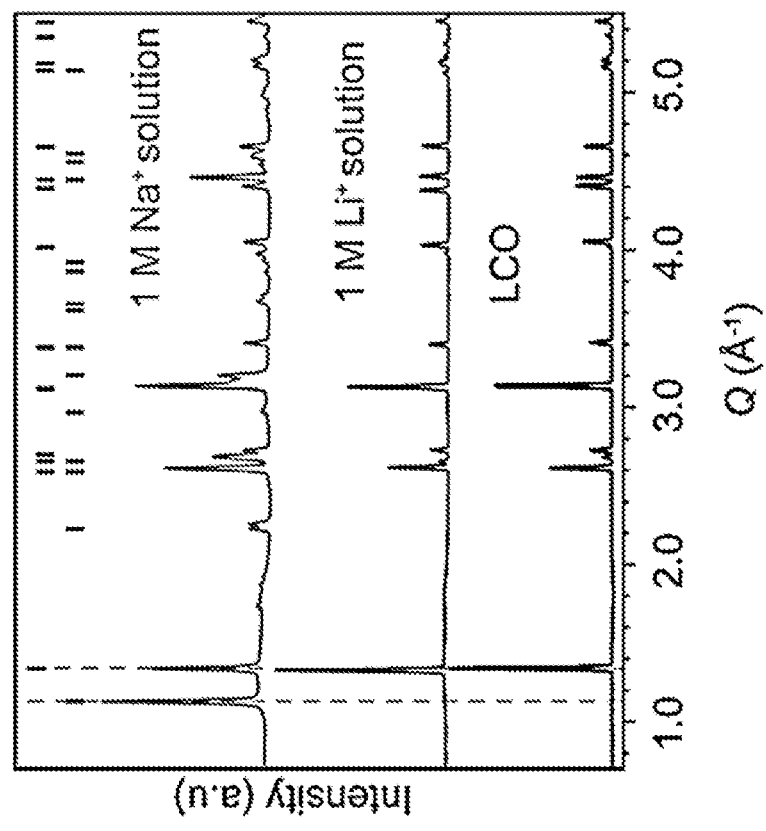
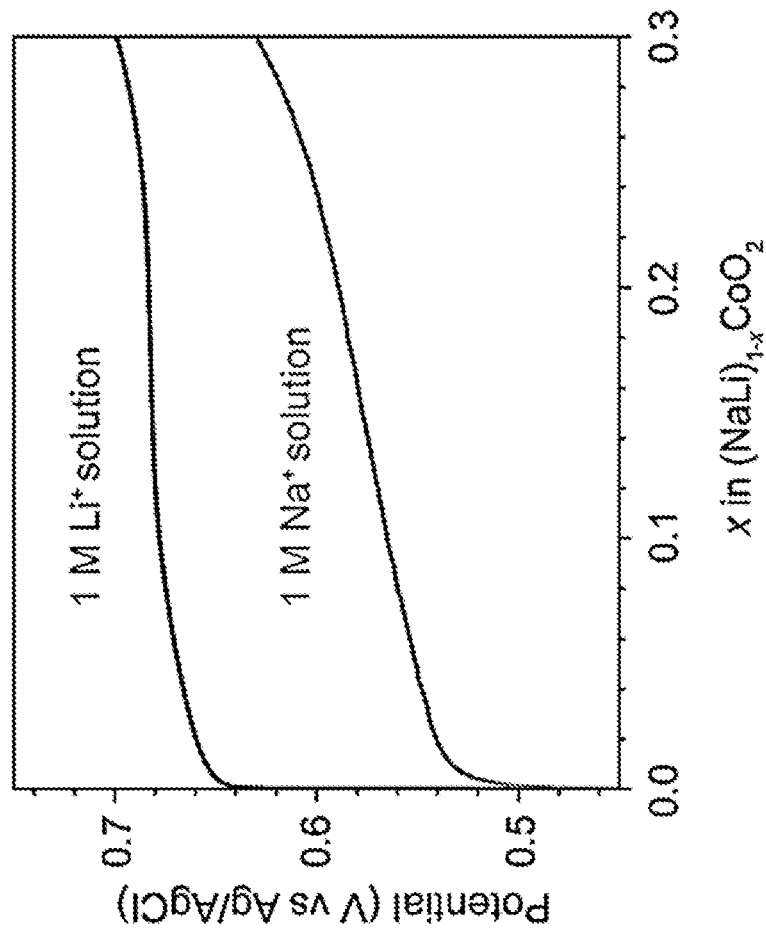
FIG. 8A
FIG. 8B

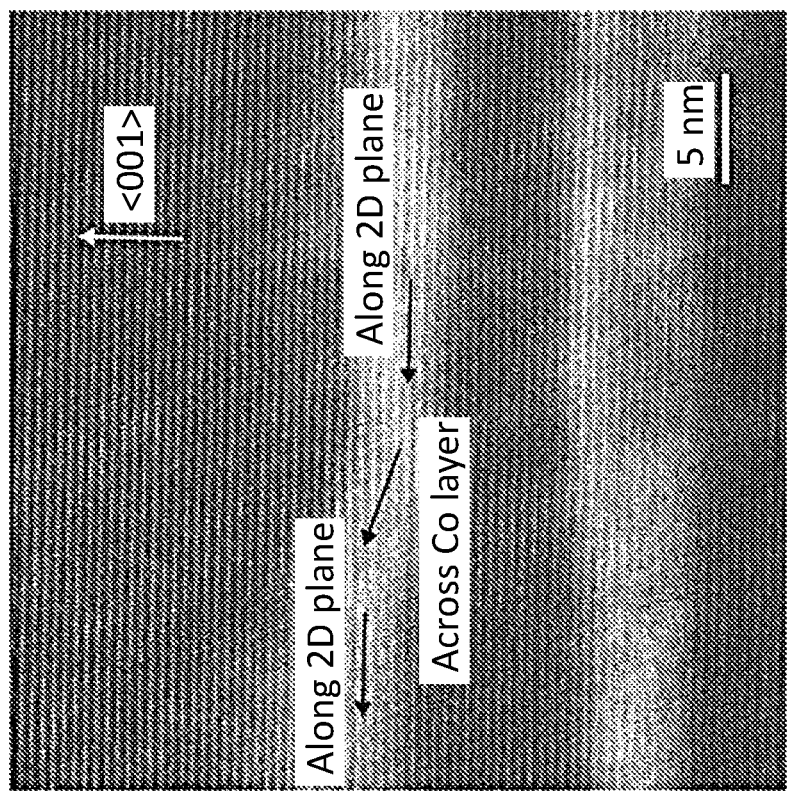
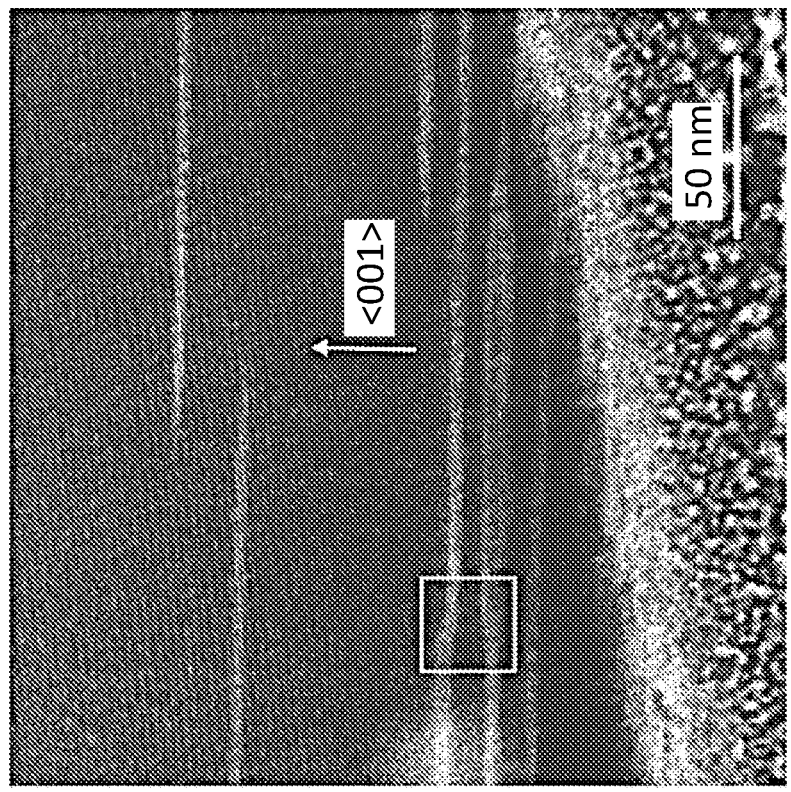
FIG. 11B
FIG. 11A

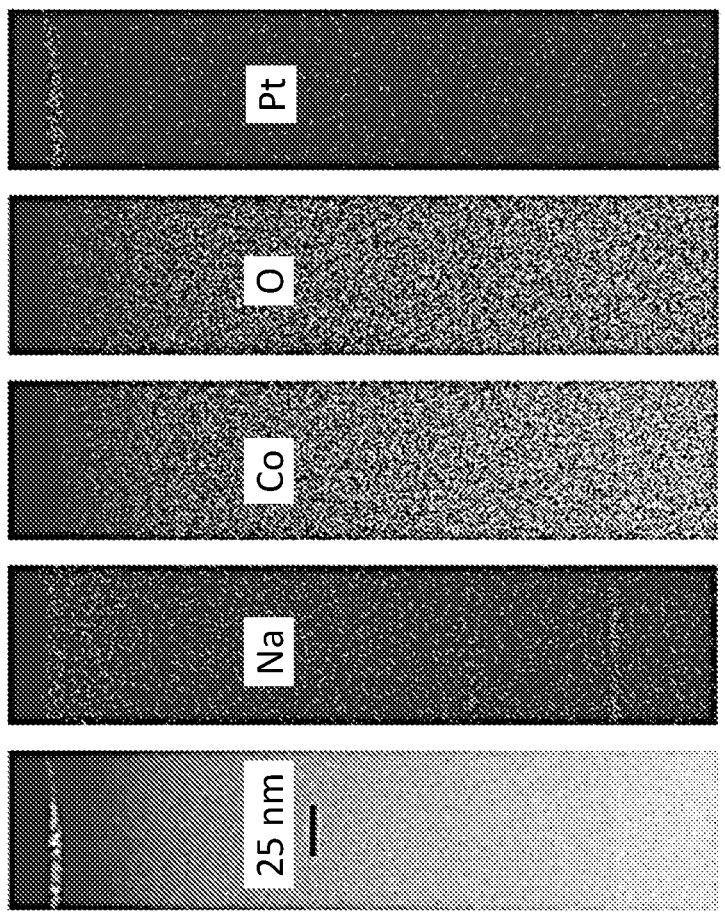
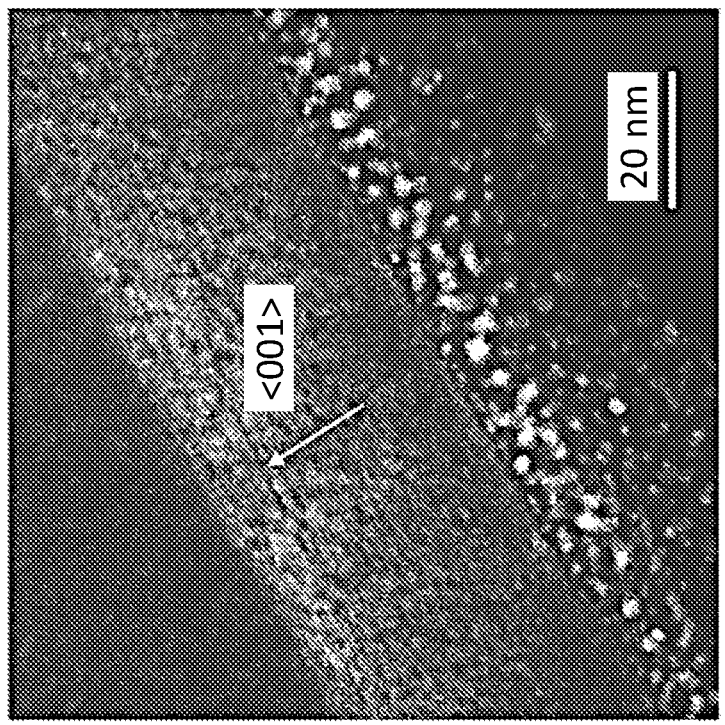
FIG. 12A
FIG. 12B

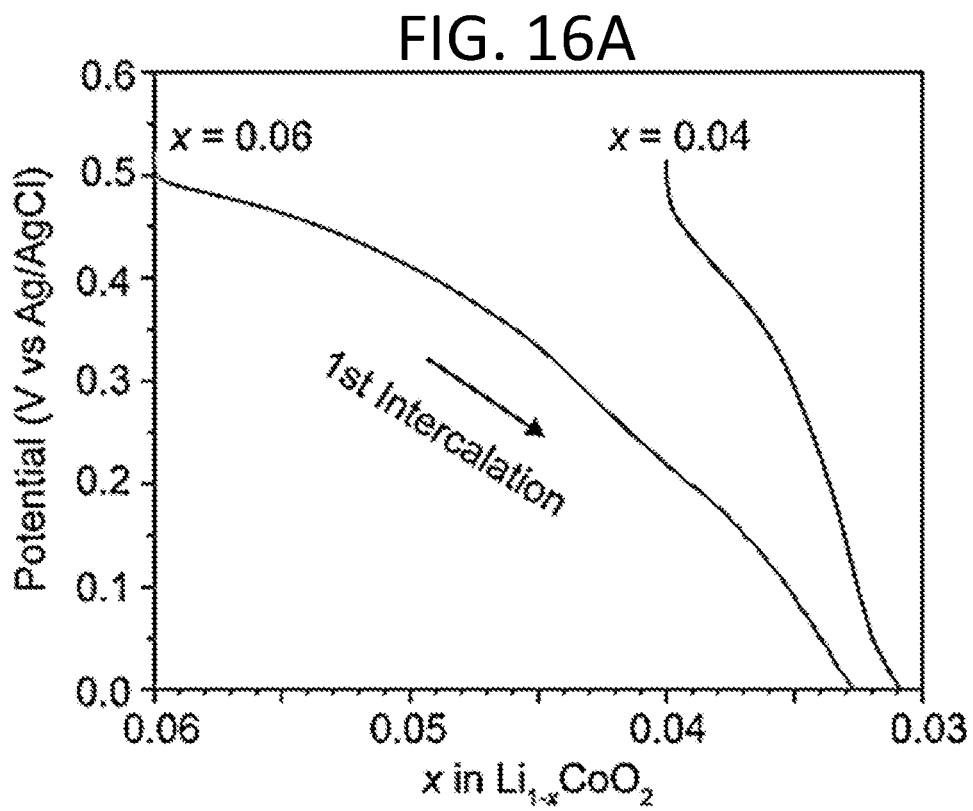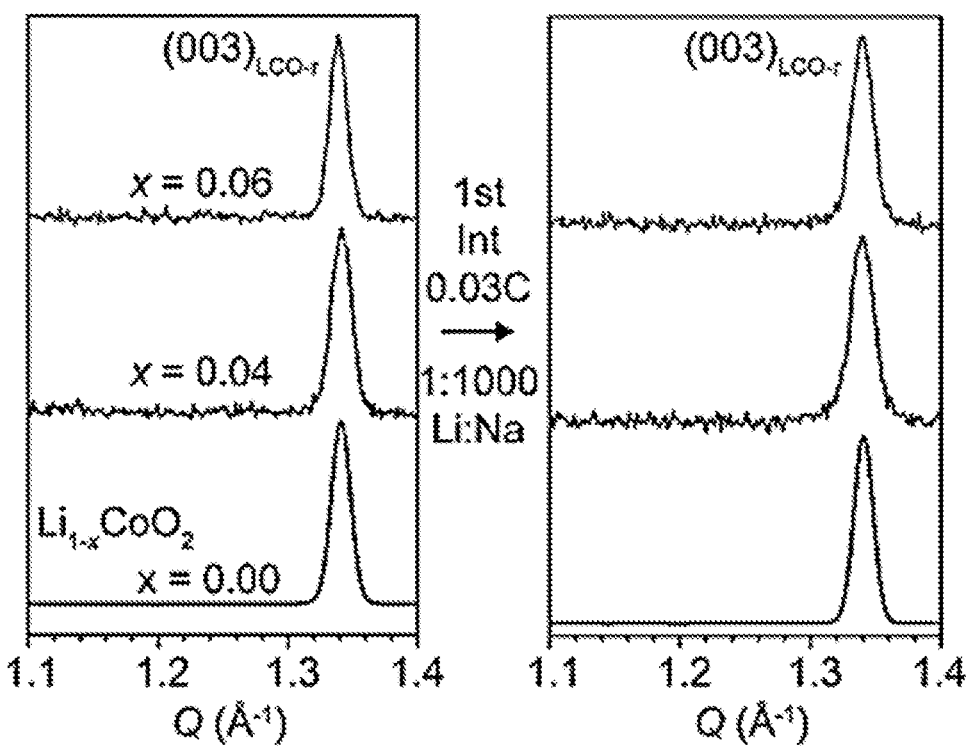
FIG. 16A
FIG. 16B
FIG. 16C

MIXED SODIUM AND LITHIUM PERIOD FOUR TRANSITION METAL OXIDES FOR ELECTROCHEMICAL LITHIUM EXTRACTION

CROSS-REFERENCE TO RELATED APPLICATIONS

The present application is a National Stage of International Application No. PCT/US22/14682, filed Feb. 1, 2022, which claims priority to U.S. provisional patent application No. 63/144,816, filed Feb. 2, 2021, the entire contents of both of which are incorporated herein by reference.

BACKGROUND

Lithium resource demand has grown tremendously over the past decades due to Li-ion battery development for electric vehicles, portable electronics, and stationary energy storage. An increase in lithium consumption has been projected to continue into the coming decades, which poses a serious risk to the current supply chain in the near to mid-term future. Lithium from brines constitutes a significant amount of the world lithium resources. This process relies on solar energy and arid climates for water evaporation over 12-18 months followed by multi-step chemical treatment and the precipitation of $Li_2CO_3$. (Gruber, P. W. et al., (2011). Journal of Industrial Ecology 15, 760-775.) These conditions will limit scaling up lithium extraction from brines to meet long term demands. Supply chain issues may be mitigated by mining other Li sources. Unconventional sources, including seawater, flow back water, and geothermal reservoirs, contain abundant Li. Currently, seawater is not an economically viable source due to the dilute lithium concentrations. (Diallo, M. S. et al., Environ. Sci. Technol. 49, 9390-9399.) Efficient and environmentally friendly Li extraction methods enabling access to the lithium in seawater could sustain a practically infinite supply.

Electrochemical extraction with Li-ion intercalation electrodes has demonstrated greater selectivity and recovery rates of lithium from brines relative to methods such as capacitive deionization and adsorption processes. Intercalation mechanisms can provide selectivity for Li over Na due to the difference of intercalation potential between Li and Na ions in the host material, which partially depends on relative differences of Li—O versus Na—O bond strength for a given crystal structure. Selectivity also depends on phase stability and differences in ion migration barriers. Therefore, the lithium extraction efficiency largely relies on the electrode material choice. The electrodes investigated include olivine $LiFePO_4$, spinel $\lambda$-$MnO_2$, and layered $LiNi_{1/3}Co_{1/3}Mn_{1/3}O_2$ (NMC), which have mainly demonstrated Li selectivity in brine solutions. All these previous studies directly adopt the conventional battery materials without tailoring the material structures and properties.

SUMMARY

Layered cobalt oxide materials, electrochemical cells incorporating the materials as electrodes, and methods for using the electrochemical cells for the extraction and recovery of lithium from solution are provided.

One embodiment of a layered cobalt oxide material includes: a $Li_{0.94}MO_2$ phase, where M is Co, Mn, Ni, or a combination of two or more thereof; a $Na_xMO_2$ phase, where $0.45 \leq x \leq 0.51$ and M is Co, Mn, Ni, or a combination of two or more thereof; and a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase.

One embodiment of a method of forming the layered Period Four transition metal oxide material that includes the steps of: electrochemically delithiating a $LiMO_2$, where M is Co, Mn, Ni, or a combination of two or more thereof, in an electrolyte solution to form a partially delithiated lithium Period Four transition metal oxide; and conducting a non-Faradaic cation-exchange on the partially delithiated lithium Period Four transition metal oxide in a solution containing dissolved sodium ions to form the layered Period Four transition metal oxide material.

One embodiment of an electrochemical cell for the extraction of lithium ions from a solution comprising lithium ions includes: a cell compartment; a lithium storage electrode in the cell compartment, the lithium storage electrode comprising a layered Period Four transition metal oxide material of a type described herein; and a counter electrode in the cell compartment, wherein the counter electrode is in electrical communication with the lithium storage electrode.

One embodiment of a method of extracting lithium from an electrolyte solution containing dissolved lithium ions using an electrochemical cell of a type described herein, includes the steps of: introducing an electrolyte solution comprising dissolved lithium ions into the cell compartment; and applying a bias voltage across the lithium storage electrode and the counter electrode, wherein the application of the bias voltage drives the intercalation of lithium ions from the electrolyte solution into the layered Period Four transition metal oxide material.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 2A shows X-ray diffraction (XRD) patterns of the $(003)_{LCO-r}$ peak of $Li_{1-x}CoO_2$ after delithiation in aqueous 1 M LiCl at 0.6 C rate, where x=0, 0.025, 0.06, 0.10, 0.20, 0.30 from bottom to top spectrum, respectively. Each spectrum is a new electrode sample. FIG. 2B shows XRD patterns of $(NaLi)_{1-x}CoO_2$ after soaking the delithiated $Li_{1-x}CoO_2$ in aqueous 1 M NaCl for 16 hours. Each spectrum in FIG. 2B corresponds to the spectrum directly to its left in FIG. 2A. The dashed lines indicate the positions of the $(003)_{NCO-m}$ peak and the $(003)_{LCO-r}$ peak. FIG. 2C shows crystal structure illustrations of a $Li_{0.70}CoO_2$ transforming into a combination of $Na_{0.51}CoO_2$ and $Li_{0.94}CoO_2$. Note that the Li-phase and Na-phase have differing alkali concentrations. The octahedrals represent $CoO_6$ units and the spheres represent $Li^+$ and $Na^+$.

FIG. 3A shows a scanning transmission electron microscopy high-angle angular dark field (STEM HAADF) image of the $(NL)_{0.7}CO$ particle cut near an electrode/electrolyte interface. Dashed lines separate a Pt coating, the Na-phase, and the Li-phase domains. The insert illustrates the micron sized $(NL)_{0.7}CO$ particle where the region of interest for imaging is indicated with an arrow, and the grey section is the Pt coating. FIG. 3B shows a STEM HAADF image and its corresponding EDS elemental mappings (Na, Co, O, Pt). FIG. 3C shows a STEM HAADF image of a $(NL)_{0.7}CO$ particle near the center of a terminated $CoO_2$ surface. The insert illustrates the region of imaging (highlighted with box). FIGS. 3D-3F show STEM low-angle annular dark field (LAADF) images of a core with Na streak (FIG. 3D) and the shell (FIG. 3E) with labeled layers for its corresponding Li-EELS spectra (FIG. 3F). FIG. 3G is a high-resolution STEM HAADF image of the core with Na-containing streaks. Layer spacings are marked with arrows. FIG. 3H shows the layer spacing highlighted with dashed lines; 4.64 Å (Li-phase); 4.92-5.02 Å (intermediate phase); and 5.60 Å (Na-phase). FIG. 3I is a schematic diagram showing an ion-exchange process and the resulting core-shell $(NL)_{1-x}CO$ particle with a sodium-rich shell and a lithium-rich core connected by an intermediate transitional phase.

FIGS. 4A-4B show $(NL)_{1-x}CO$ performance as a Li extraction electrode. Performance results are shown for deintercalation into recovery solution after cycling in various concentrations (M) of $Li^+$ with 1 M $Na^+$, denoted by a Li to Na ratio 1:100, 1:1,000, 1:5,000, and 1:10,000, and 1:20,000. The recovered Li/(Li+Na) (FIG. 4A) is the ratio of moles of $Li^+$ to the total moles of $Li^+$ and $Na^+$ in the recovery solution. The efficiency of the recovery process (FIG. 4B) compares the total moles of measured cations (Lit, Nat) via Inductively Coupled Plasma-Mass Spectroscopy (ICP-MS) over the expected total mols via Coulomb counting.

FIG. 5A shows constant current intercalation and deintercalation at 0.6 C rate for 21 mins in a $Li^+$ spiked solution. The x in $(NaLi)_{1-x}CoO_2$ ranges between 0.195 and 0.300. FIG. 5B shows $Li^+$ (grey) and $Na^+$ (black) ratios measured after dissolving the cathodes in stages: pristine $LiCoO_2$ (LCO), initial $(NL)_{1-x}CO$ (Delith), $1^{st}$ intercalation ($1^{st}$ int) and deintercalation ($1^{st}$ deint), $2^{nd}$ intercalation ($2^{nd}$ int), $19^{th}$ deintercalation ($19^{th}$ deint), and $20^{th}$ intercalation ($20^{th}$ int) and deintercalation ($20^{th}$ deint) after cycling in the 1:1000 solution. FIG. 5C shows XRD spectra for sample $(NaLi)_{1-x}CoO_2$ at the end of an intercalation x=0.195 and deintercalation x=0.300 at different cycles. FIG. 5D shows a detailed view of the $(003)_{NCO-m}$, $(003)_{LCO-r}$, and intermediate peaks from the XRD spectrum.

FIG. 6A shows that reduction of the host structure Co cations allows Li or Na intercalation from a seawater/brine-like solution. FIG. 6B shows that oxidation of the host structure Co cations allows Li or Na deintercalation into a recovery solution.

FIGS. 8A-8B show comparisons of delithiation of LCO in 1 M $Na^+$ and 1 M $Li^+$ solutions. FIG. 8A shows galvanostatic deintercalation at 0.6 C rate for 1 hour in aqueous 1 M $Li^+$ and 1 M Nat FIG. 8B shows an XRD spectrum for $LiCoO_2$ (black, ICDD PDF: 01-080-4975), $Li_{0.70}CoO_2$ (ICDD PDF: 01-076-3173) after delithiation in aqueous 1 M Lit, and $(NaLi)_{0.70}CoO_2$ after delithiation in aqueous 1 M $Na^+$.

FIG. 9A shows a galvanostatic deintercalation curve at 1 C for 33 min in aqueous 1 M NaCl using the in situ electrochemical cell. FIG. 9B shows a detailed XRD spectrum of the Q range for the $(003)_{NCO-m}$ (black dashed line).

FIGS. 11A-11B show STEM LAADF images of a $(NL)_{0.7}CO$ particle at an electrode/electrolyte interface. The image shown in FIG. 11A corresponds to STEM HAADF image in FIG. 3A showing the Na-phase shell and Li-phase core of the $(NL)_{0.7}CO$ particle cut near the electrode/electrolyte interface. The image shown in FIG. 11B shows the highlighted square in FIG. 11A.

FIGS. 12A-12B show a STEM LAADF image (FIG. 12A) and elemental analysis (FIG. 12B) of $(NL)_{0.7}CO$ near the center of a terminated $CoO_2$ plane.

FIG. 15C shows the recovery of Li in 0.49 M and 1.0 M 1:20,000 Li:Na solution at a 0.60 C rate.

FIGS. 16A-16C show the poor intercalation capacity of a Li-rich phase. FIG. 16A shows the $1^{st}$ intercalation of $Li_{0.94}CoO_2$ and $Li_{0.96}CoO_2$ at 0.03 C rate in 1:1,000 Li to Na aqueous solution. FIGS. 16B-16C show XRD patterns of the $(003)_{LCO-r}$ peak of $Li_{1-x}CoO_2$ after (FIG. 16B) delithiation in aqueous 1 M LiCl at 0.6 C rate with 2 hr rest and (FIG. 16C) $1^{st}$ intercalation in 1:1,000 Li to Na aqueous solution at 0.03 C rate from FIG. 16A.

FIG. 17A shows the $1^{st}$ intercalation curve of $(NL)_{1-x}CO$ and $L_{1-x}CO$ in 1:1,000 Li to Na aqueous solution at a 0.6 C rate. FIG. 17B shows the $Li^+$ and $Na^+$ ratios measured after dissolving the cathodes in stages: $(NL)_{1-x}CO$ after initial deintercalation, $(NL)_{1-x}CO$ $1^{st}$ intercalation, $Li_{1-x}CO$ after initial deintercalation, and $Li_{1-x}CO$ $1^{st}$ intercalation.

FIG. 19A shows constant current intercalation and deintercalation at 0.6 C rate for 21 mins in Li to Na ratio 1:20,000 solution. FIG. 19B shows the XRD spectrum for cycling with a detailed view of the $(003)_{NCO-m}$ (left), intermediate phase (middle), and $(003)_{LCO-r}$ (right) peaks.

DETAILED DESCRIPTION

Figure 1:
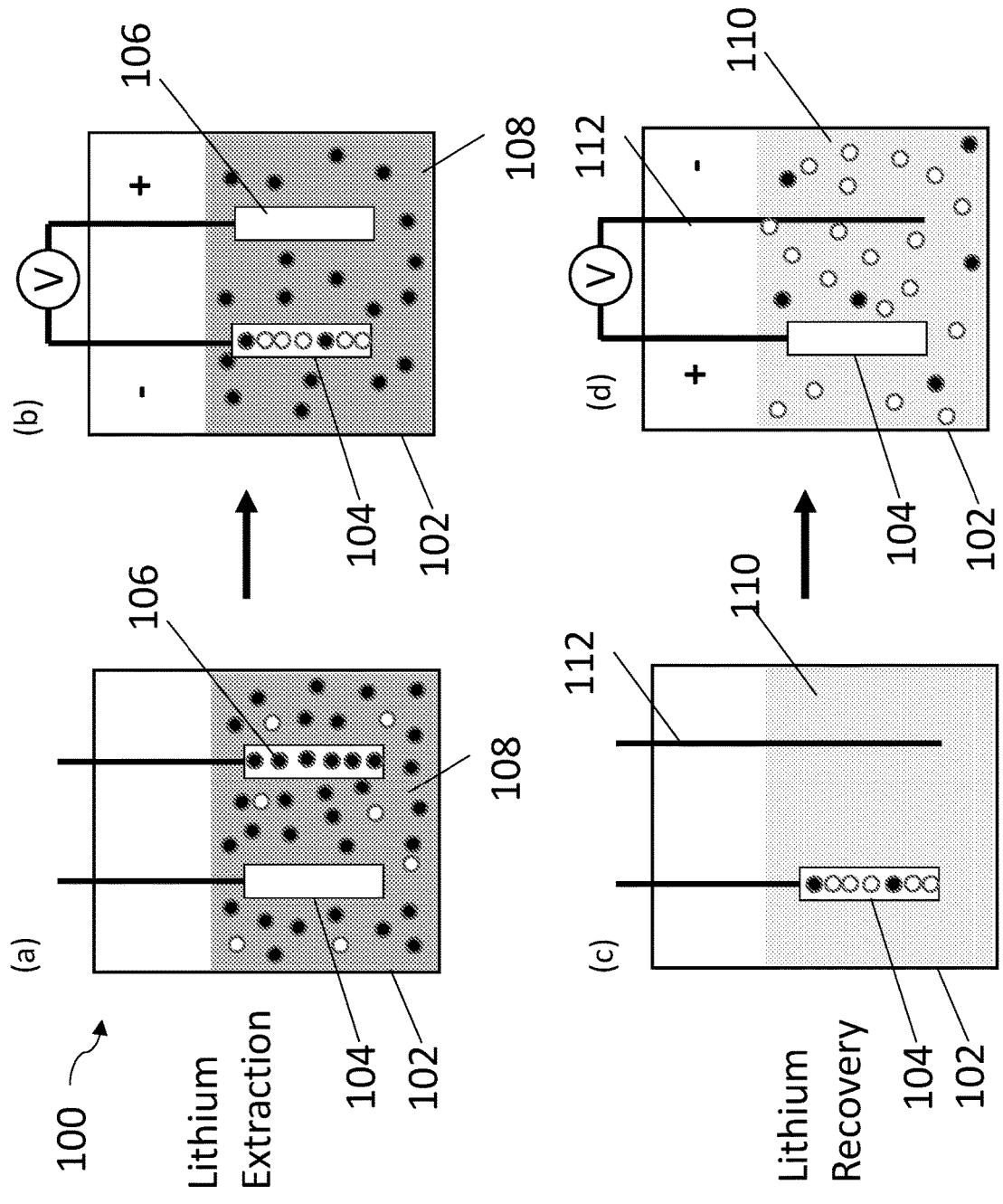
FIG. 1, panels (a)-(d), shows a schematic diagram of an electrochemical cell for the extraction and recovery of lithium from a dilute aqueous solution.

Layered Period Four transition metal oxide materials comprising lithium transition metal oxides and sodium transition metal oxides, wherein the transition metal is selected from cobalt, manganese, nickel or a combination thereof, are provided. Also provided are methods for the synthesis of the layered Period Four transition metal oxides; electrochemical cells incorporating the layered Period Four transition metal oxides as electrode materials; and methods for extracting dissolved lithium from solution using the electrochemical cells.

In the materials a lithium transition metal oxide phase and a sodium transition metal oxide phase exist as separate phases connected by a transition region comprising both lithium transition metal oxides and sodium transition metal oxides to form a stable structure. The lithium transition meal oxide phase comprises a discrete layered lithium transition metal oxide having the formula $Li_{0.94}MO_2$. The sodium transition metal oxide phase comprises a discrete layered sodium transition metal oxide having the formula $Na_xMO_2$, where $0.45 \leq x \leq 0.51$, and M represents Co, Mn, Ni, or a combination thereof. By way of illustration, a lithium cobalt oxide-based material includes a discrete layered lithium cobalt oxide having the formula $Li_{0.94}CoO_2$ and a sodium cobalt oxide phase comprises a discrete layered sodium cobalt oxide having the formula $Na_xCoO_2$, where $0.45 \leq x \leq 0.51$.

In the layered transition metal oxides in which the transition metal is selected from cobalt, manganese, nickel or a combination thereof, the monovalent alkali ions (i.e., lithium or sodium ions) are intercalated between sheets of the transition metal atoms and the oxygen atoms, and the distance between the sheets is characterized as an interlayer spacing. the $Na_xMO_2$, where $0.45 \leq x \leq 0.51$, has a higher interlayer spacing than $Li_{0.94}MO_2$. Present between the lithium transition metal oxide phase and the sodium transition metal oxide phase is a transition region in which the material transitions from the smaller interlayer spacing of the lithium transition metal oxide to the larger interlayer spacing of the sodium transition metal oxide, and the composition transitions from the lithium transition metal oxide composition to the sodium transition metal oxide composition. This transition region may comprise one or more sodium transition metal oxide and one or more lithium transition metal oxide phases.

The materials may take a variety of forms, including particles or a coating layer on a substrate, and the lithium transition metal oxide and sodium transition metal oxide phases may be distributed at various locations within the material. The lithium transition metal oxide phase and the sodium transition metal oxide phase may be distributed uniformly though the material or may be concentrated lithium-rich and sodium-rich regions within the material, respectively. For example, if the material takes the form of particles, the lithium transition metal oxide phase may have a higher concentration at the center of the particles, while the sodium transition metal oxide phase may have a higher concentration closer to the surfaces of the particles. However, the opposite arrangement, in which the sodium transition metal oxide phase has a higher concentration at the center of the particles and the lithium transition metal oxide phase has a higher concentration closer to the surfaces of the particles is also possible.

As used herein, the term "lithium-rich region" indicates that the concentration of the lithium transition metal oxide phase is higher than the concentration of the sodium transition metal oxide phase in that region of the material, on a mole basis. Similarly, the term "sodium-rich region" indicates that the concentration of the sodium transition metal oxide phase is higher than the concentration of lithium transition metal oxide phase in that region of the material, on a mole basis. Thus, while a given volume of the material corresponding to a lithium-rich region may contain some sodium transition metal oxide phase, the sodium transition metal oxide phase ($Na_{(0.45-0.51)}MO_2$, where M=Co, Mn, Ni, or a combination thereof) will make up a minority (for example, <50%, <10%, or <1%) volume fraction. Similarly, while a given volume of the material corresponding to a sodium-rich region can contain some lithium transition metal oxide phase, the lithium transition metal oxide phase ($Li_{0.94}MO_2$, where M=Co, Mn, Ni, or a combination thereof) will make up a minority (for example, <50%, <10%, or <1%) volume fraction of that volume. The minority lithium transition metal oxide phase or minority sodium transition metal oxide phase may exist in the sodium-rich phase or the lithium rich phase, respectively, in the form of, for example, inclusions. By way of illustration, in some embodiments, the sodium to lithium volume ratio in a lithium-rich region is less than 1:2, less than 1:3, less than 1:5, less than 1:20, or less than 1:100, and the lithium to sodium mole ratio in a sodium-rich region is less than 1:2, less than 1:3, less than 1:5, less than 1:20, or less than 1:100.

In the layered Period Four transition metal oxides, the monovalent alkali ions (i.e., lithium or sodium ions) are intercalated between sheets of the transition metal atoms (Co, Mn, Ni) and oxygen atoms, and the distance between the sheets is characterized as an interlayer spacing. Because $Na_{(0.45-0.51)}MO_2$ has a higher interlayer spacing than $Li_{0.94}MO_2$, the sodium-rich shell of the core-shell structure has a higher interlayer spacing than the lithium-rich core. Present between the core and the shell is a transition region in which the core-shell structure transitions from the smaller interlayer spacing of the Li-rich core to the larger interlayer spacing of the Na-rich shell, and the composition transitions from the lithium-rich composition of the core to the sodium-rich composition of the shell. This transition region may comprise one or more sodium transition metal oxide and lithium transition metal oxide phases.

Some embodiments of the materials have a core-shell structure characterized by a core which is at least partially coated with a shell. It should be understood, however, that in the core-shell structures, the shell may be a discontinuous layer and need not completely surround the core. The core of the core-shell structured materials can be a lithium-rich region and the shell of the core-shell structured materials can be a sodium-rich region, and vice versa. While the core of a core-shell structured material having a lithium-rich core can contain sodium transition metal oxide phases, those sodium transition metal oxide phases (e.g., $Na_{0.45-0.51}MO_2$) will make up a minority (<50%) volume fraction of the core. Similarly, while the shell of a core-shell structured material having a sodium-rich shell can contain lithium transition metal oxide phases, those lithium transition metal oxide phases (e.g., $Li_{0.94}MO_2$) will make up a minority (<50%) volume fraction of the shell. In some embodiments of the core-shell structured, layered transition metal oxide materials, the shell is free of lithium-containing phases.

Conversely, the core of a core-shell structured material having a sodium-rich core can contain lithium transition metal oxide phases, those lithium transition metal oxide phases (e.g., $Li_{0.94}MO_2$) will make up a minority (<50%) volume fraction of the core. Similarly, while the shell of a core-shell structured material having a lithium-rich shell can contain sodium transition metal oxide phases, those sodium transition metal oxide phases (e.g., $Na_{0.45-0.51}MO_2$) will make up a minority (<50%) volume fraction of the shell. In some embodiments of the core-shell structured, layered transition metal oxide materials, the shell is free of sodium-containing phases.

In the core-shell structured layered transition metal oxides, the transition region is present between the core and the shell in which the layer spacing transitions from the smaller interlayer spacing of the lithium-rich region (core or shell) to the larger interlayer spacing of the sodium-rich region (shell or core), and the composition transitions from the lithium-rich composition of the core or shell to the sodium-rich composition of the shell or core. This transition region may comprise one or more sodium transition metal oxide and one or more lithium transition metal oxide phases.

Lithium transition metal oxides, $LiMO_2$, where M is Co, Mn, Ni, or a combination thereof, are examples of a starting material that can be used for the synthesis of the layered transition metal oxide materials, including the core-shell structured embodiments. When these compounds are used as the starting materials, the $LiMO_2$ is electrochemically delithiated in an electrolyte solution, which may be aqueous or non-aqueous, to form a partially delithiated lithium transition metal oxide. The partially delithiated lithium transition metal oxide is then sodiated using a non-Faradaic cation-exchange in a solution containing dissolved sodium ions to form the material comprising the lithium transition metal oxide phase and the sodium transition metal oxide phase. For example, the starting $LiMO_2$ can be delithiated to form $Li_{1-x}MO_2$, where $x \geq 0.06$, including $0.06 < x < 0.5$, and further including $x=0.3$. A non-Faradaic cation-exchange can then be carried out on the $Li_{1-x}MO_2$ in an aqueous or organic (i.e., non-aqueous) solution containing dissolved sodium ions to convert the $Li_{1-x}MO_2$ into a stable structure that contains discrete $Li_{0.94}MO_2$ and $Na_{0.45-0.51}MO_2$ phases. A detailed description of a method for forming the layered cobalt oxide material starting with $LiCoO_2$ is provided in the example. In the embodiment of the method presented in the example, the initial electrochemical delithiation forms $Li_{0.7}CoO_2$. Therefore, the core-shell structured material made therefrom is referred to as a core-shell $(NL)_{0.7}CO$. The example demonstrates that the lithium transition metal oxide and sodium transition metal oxide phases of materials can be distinguished using such techniques as scanning transmission electron microscopy high-angle angular dark field (STEM HAADF) imaging.

While the Example uses a layered cobalt oxide material as an illustrative example, it should be understood that the same synthesis methods described in the Example can be used to form the corresponding layered manganese oxide materials, layered nickel oxide materials, or layered mixed Co, Mn, and/or Ni transition metal oxide materials, by starting with the corresponding lithium transition metal oxide starting materials. Moreover, the characterization methods and lithium ion extraction methods described in the Example can be applied to the corresponding layered manganese oxide materials, layered nickel oxide materials, or layered mixed Co, Mn, and/or Ni transition metal oxide materials.

Sodium transition metal oxides, $Na_yMO_2$, where M represents Co, Mn, Ni, or a combination thereof, and $0.5 \leq y \leq 1$, are other examples of starting materials from which the layered transition metal oxide materials, including the core-shell structured embodiments, can be made. For values of y at the higher end of the scale (for example, for $y > 0.7$), $Na_yMO_2$ may be electrochemically desodiated in an aqueous electrolyte solution to form a partially desodiated sodium transition metal oxide in order to prepare it for the subsequent ion-exchange. However, when the starting sodium transition metal oxide is already sufficiently partially desodiated to accommodate the ion-exchange step (discussed below), the electrochemical desodiation step may be omitted. The partially desodiated sodium transition metal oxide is lithiated using a non-Faradaic cation-exchange in an aqueous or organic solution containing dissolved lithium ions to form the material comprising the lithium transition metal oxide phase and the sodium transition metal oxide phase. For example, a starting $Na_yMO_2$ having $y > 0.67$ can be desodiated to form $Na_{0.67}MO_2$, followed by non-Faradaic cation-exchange in an aqueous or organic solution containing dissolved lithium ions to convert the $Na_{0.67}MO_2$ into a stable structure that contains discrete $Li_{0.94}MO_2$ and $Na_{0.45-0.51}MO_2$ phases.

The layered transition metal oxide materials can be used as electrode materials in electrochemical cells designed for the extraction of dissolved lithium ions via electrochemically driven intercalation. When the materials are used as an electrode in an electrochemical cell for lithium extraction from a dilute solution containing both lithium ions and sodium ions, the lithium ions are preferentially taken up by the electrode with a high selectivity.

One illustrative embodiment of an electrochemical cell for lithium extraction is shown in FIG. 1, panels (a)-(d). The electrochemical cell 100 includes a cell compartment 102, a lithium storage electrode 104 comprising a layered transition metal oxide material as described herein, and a counter electrode 106 in electrical communication with lithium storage electrode 104. In the illustrative embodiment of the electrochemical cell shown in FIG. 1, panel (a), cell compartment 102 contains an electrolyte solution 108 having lithium ions (open circles) and sodium ions (black dots) dissolved therein, and counter electrode 106 comprises a sodiated electrode material. The sodiated electrode material in the embodiment of FIG. 1, panels (a)-(d), can be, for example, $NaFePO_4$. However, other sodiated electrode materials that release sodium ions upon the application of a bias voltage, including other sodium intercalation electrode materials such as Prussian blue, can be used. In addition, carbon or metal electrodes can be used with an oxygen evolution reaction if the working electrode is protected. Seawater or lithium ion-containing water from another source, such as a natural body of water (e.g., a salt lake or a geothermal brine) or from wastewater (e.g., industrial wastewater) may be used as aqueous electrolyte solution 108. It should be noted that the lithium storage electrode and the counter electrodes shown in FIG. 1, panels (a)-(d), may include materials other than the active electrode materials. For example, the electrodes may include a support substrate upon which the electrode materials are deposited, a binder material in which the electrode materials are dispersed, and/or electrically conductive materials that enhance the conductivity of the electrodes. The electrochemical cell can further include a voltage source that applies a bias voltage across the cell electrodes to drive the lithium extraction and recovery cycles.

When a bias voltage is applied across the electrodes (FIG. 1, panel (b)), lithium ions in electrolyte solution 108 are transferred from the solution into the layered transition metal oxide material of lithium storage electrode 104. Sodium ions also may be transferred into electrode 104. However, as discussed below and demonstrated in the example, the layered transition metal oxide material extracts lithium ions with a very high selectivity over sodium ions.

Once the lithium extraction cycle is completed, the aqueous electrolyte solution 108 can be replaced with a lithium recovery solution 110 and a reverse bias can be applied across the electrodes in order to recover the stored lithium. If first counter electrode 106 does not have a high selectivity for sodium over lithium in the recovery solution, it should be replaced by another counter electrode 112 that does (FIG. 1, panel (c)). This can be carried out by exchanging the electrolyte solution and the counter electrode in cell compartment 102, or by moving the now-lithiated lithium storage electrode 104 into a new cell compartment containing the lithium recovery solution and equipped with a second counter electrode. By way of illustration, a graphite electrode may be used as the counter electrode during the lithium recovery cycle. However, other counter electrodes, including metal electrodes or other Faradaic electrodes, could be used. A reverse bias is then applied across the electrodes (FIG. 1, panel (d)) to release the intercalated lithium ions and sodium ions into the lithium recovery solution from which the lithium can be recovered.

During the intercalation (lithiation) and deintercalation (delithiation) cycles, the relative sizes of the lithium transition metal oxide and the sodium transition metal oxide phases oscillate dynamically, whereby the $Li_{0.94}MO_2$ phase increases during intercalation and decreases during deintercalation, reflecting the dominant nature of the lithium charge transfer in the electrode.

Without intending to limit the invention to any particular theory of operation, the high selectivity of the layered transition metal oxide materials may be explained as follows. During the lithium extraction cycle, the $Na_xMO_2$ ($0.45 \leq x \leq 0.51$) phase and the transition region of the layered transition metal oxide material serve as sinks for further intercalation, while the presence of the $Li_{0.94}MO_2$ phase restricts the interlayer expansion of the layered transition metal oxides. By maintaining a consistent and small layer spacing in the lithium-rich region, the structure promotes high selectivity towards lithium ions over sodium ions. The $Na_xMO_2$ ($0.45 \leq x \leq 0.51$) phase may also limit the extent to which lithium in the structure is exchanged with sodium from the solution, thereby enhancing electrode stability. The intermediate phases of the transition region may also play a role of storing extracted lithium and limiting the intercalation of the larger sodium ions, due to their reduced interlayer spacing. This complex phase relationship enables high lithium ion extraction with high lithium selectivity.

Electrochemical cells for lithium recover that incorporate the layered Period Four transition metal oxide materials described herein as electrodes can preferentially recover lithium over sodium with high selectivities, even from dilute solutions having high sodium:lithium (Na:Li) ratios. By way of illustration, embodiments of the electrochemical cells can recover lithium from a solution containing both lithium and sodium with a selectivity of at least $1 \times 10^4$. This includes embodiments of the electrochemical cells that can recover lithium from a solution containing both lithium and sodium with a selectivity of at least $1 \times 10^5$. By way of illustration only, selectivities in the range from $1 \times 10^4$ to at least $3 \times 10^5$ can be achieved from starting solutions having Li:Na ratios in the range from 1:1000 to 1:20,000.

Example

This example demonstrates a method of forming an electrode for the electrochemical extraction of lithium from aqueous solutions. Additional details about the methods and the characterization and performance of the electrodes can be found in the Appendix at the end of this example.

The electrodes are made by immersing $Li_{1-x}CoO_2$ particles into a sodium-containing water solution without any applied current. When x is above a threshold value, the particles are transformed into a new core-shell structure having a core of $Li_{0.94}CoO_2$, a shell of $Na_{0.51}CoO_2$, and an intermediate phase connecting the core and the shell. The chemical compositions and spatial distribution of these phases in the $(NaLi)_{1-x}CoO_2$ is significant in governing a high Li selectivity with stable co-intercalation. The shell Na-phase and the intermediate phase serve as sinks for further intercalation. The existence and connection of the core Li-phase to the shell restricts the layer expansion and promotes high selectivity towards Li. The $Na_{0.51}CoO_2$ shell also prevents further Na ion-exchange and maintains the electrode stability. During intercalation and deintercalation, the ratio of the Li-phase/Na-phase oscillates dynamically, which increases during intercalation and decreases during deintercalation, pointing to Li dominating the charge transfer in the electrode. The $(NaLi)_{1-x}CoO_2$ electrode can extract Li selectively for a range of Li and Na combined solutions with a Li to Na mol ratio of 1:100 to 1:20,000. In the lowest Li concentration solution (Li:Na of 1:20,000), a recovery solution was achieved with a Li to Na mol ratio of ~7.6:1 in a single electrochemical extraction that is equivalent to a high Li selectivity of $1.5 \times 10^5$.

Results and Discussion

Li/Na Ion-Exchange with Parent $Li_{1-x}CoO_2$

The electrochemical Li extraction works by extracting (electrochemical intercalation) Li from a dilute Li solution and then recovering (electrochemical deintercalation) Li in a fresh solution. The aqueous cycling stability of pure $LiCoO_2$ (LCO) is good between 0.6-0.72 V vs Ag/AgCl. The stable cycling verified that LCO can be cycled in aqueous solution when oxygen evolution reaction and hydrogen evolution reaction are avoided. For electrochemical extraction with layered cobalt oxide, vacancies are first created via an initial delithiation of parent LCO. An aqueous 1 M $Na^+$ solution instead of $Li^+$ was used as the electrolyte. From X-ray diffraction (XRD) analysis, the $(003)_{LCO-r}$ Bragg peak of the pristine LCO (R$\bar{3}$m) shifts to 1.342 Å$^{-1}$ from 1.344 Å$^{-1}$ after delithiation at 0.6 C rate for 1 hour in $Na^+$ solution. This phase transformation is far from the expected $Li_{0.70}CoO_2$[22]. New peaks appeared, with the most notable being at 1.128 Å$^{-1}$. The peaks match well for a combination of rhombohedral $Li_{0.94}CoO_2$(R$\bar{3}$m) and monoclinic $Na_{0.51}CoO_2$ (C2/m). The characteristic peak at 1.128 Å$^{-1}$ is the $(003)_{NCO-m}$. The smaller Q value of the $(003)_{NCO-m}$ peak than the $(003)_{LCO-r}$ indicates an expansion of the layer spacing due to the intercalation of the $Na^+$ (102 pm) relative to the smaller $Li^+$ (76 pm), as well as a higher vacancy percentage and increased electrostatic repulsion.

Figures 2A, 2B:
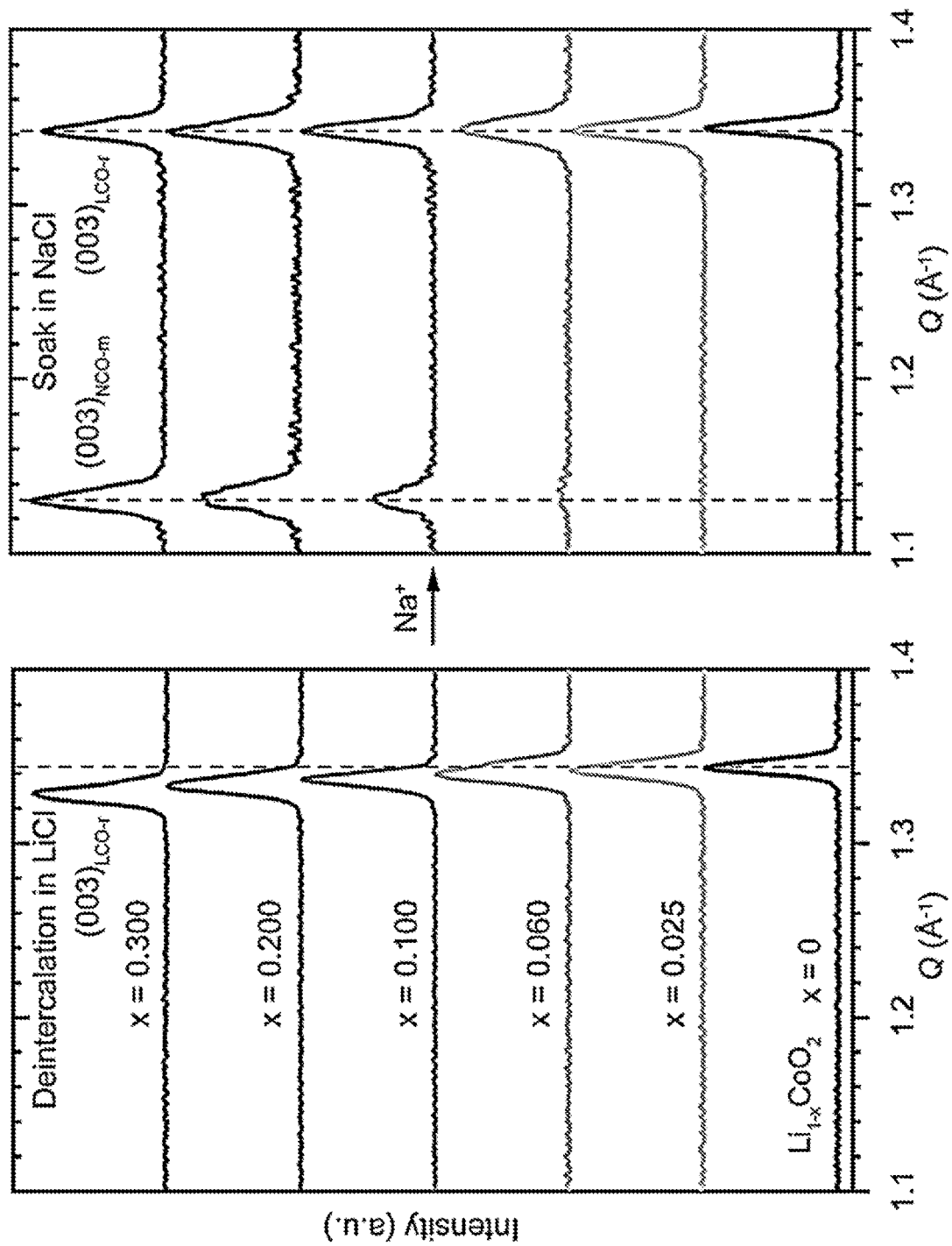
FIGS. 2A-2C show phase transformation of delithiated $Li_{1-x}CoO_2$ into $(NaLi)_{1-x}CoO_2$.

Once vacancies are formed, the Na/Li exchange occurs quickly without applied current, as characterized by in-situ XRD during initial delithiation. To maintain the charge neutrality, Na in the solution exchanges with Li in the structure and leaves the material with the same vacancy percentage as $(NaLi)_{1-x}CoO_2$ (($NL)_{1-x}CO$). For this process to be understood, the dependence of Na/Li exchange on the vacancy percentage was investigated and the equilibrium of the same Li-phase and Na-phase was observed. $Li_{1-x}CoO_2$ at different vacancy percentage x was generated using a 1 M $Li^+$ solution. FIG. 2A shows the shifting $(003)_{LCO-r}$ peak of LCO from delithiation due to the increased vacancy composition. Next, the samples were soaked in a 1 M $Na^+$ solution overnight for the cation exchange. As shown in FIG. 2B, the $(003)_{NLCO-r}$ peak of $Li_{1-x}CoO_2$ with vacancies of $x \geq 0.06$ shifted to 1.342 Å$^{-1}$ and allowed the emergence of the $(003)_{NCO-m}$ peak at 1.128 Å$^{-1}$. The expected threshold should be greater than 6% vacancy so that enough vacancy composition is available for both phases. The emergence of Na-phase at the 6% vacancy sample could be due to the heterogeneity, as evidenced by $(003)_{LCO-r}$ peak splitting in FIG. 2A. The $(003)_{NCO-m}/(003)_{LCO-r}$ intensity ratio increased with the vacancy percentage, with 0.104 at 6% vacancy and 1.093 at 30% vacancy indicating a growing Na-phase at a higher vacancy percentage. The key material changes are summarized in FIG. 2C. The illustration highlights the formation of the new $(NL)_{1-x}CO$ from the transformation of $Li_{1-x}CoO_2$ into a combination of the $Li_{0.94}CoO_2$ with a contracted layer spacing and the $Na_{0.51}CoO_2$ with an expanded layer spacing and distorted lattice compared to the rhombohedral $Li_{1-x}CoO_2$.

Core-Shell Phase Separation of Li-Phase and Na-Phase

Figure 3A:
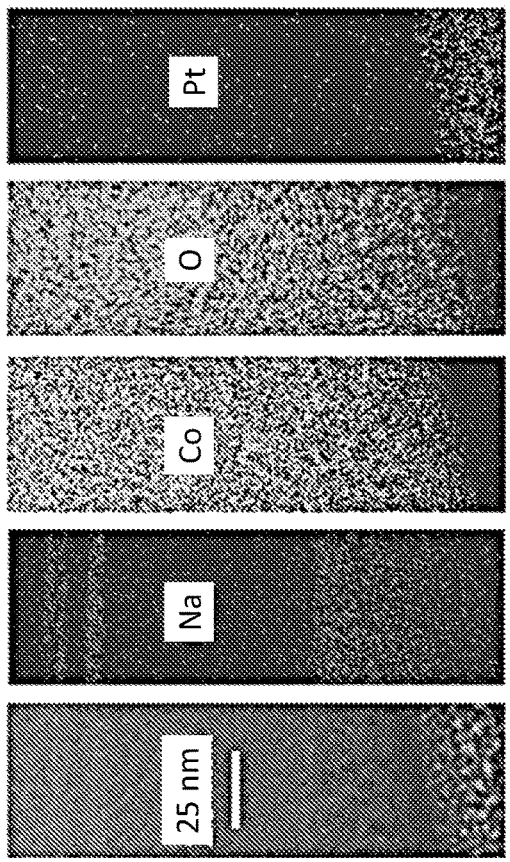
FIGS. 3A-3I show characterization of a shell Na-phase and core Li-phase in a $(NL)_{0.7}CO$ material.
Figure 3B:
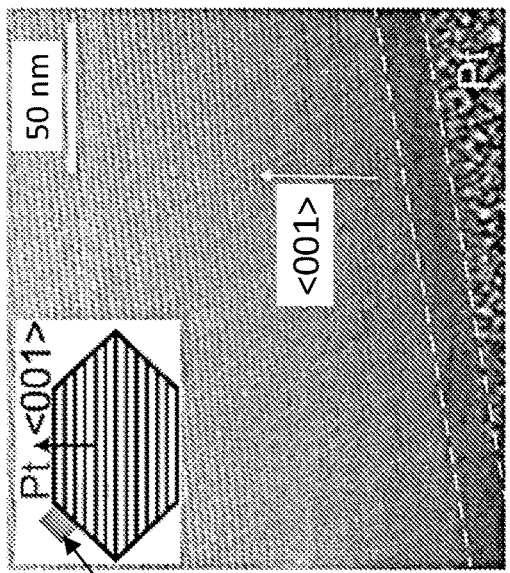

Since the spatial distribution of these phases would impact the further intercalation, and, therefore selectivity of the electrode, the new $(NL)_{0.7}CO$ was characterized to atomic resolution. Individual particles were thinned with a focused ion beam (FIB)/scanning electron microscope (SEM) for imaging with scanning transmission electron microscopy (STEM). Elemental characterization was achieved with energy-dispersive X-ray spectroscopy (EDS) and electron energy loss spectroscopy (EELS). The first area of interest was near the side of the particle at the electrode and electrolyte interface where the Na/Li exchange occurs. Pt was deposited on the outer surface of the particle before sample thinning, and its position labeled the electrode and electrolyte interface. Selected area diffraction patterns confirmed the STEM image view along the [110] zone axis. The STEM HAADF image in FIG. 3A shows four distinct regions by contrast. First, the bottom of the image consists of the protective Pt coating from the particle thinning procedure. Second, above the Pt region there exists a darker contrast region that would have previously been the electrode and electrolyte interface. Third, a lighter contrast region makes up the core of the particle. Fourth, a significant number of lighter streaks run parallel to each other within the core region. The particle surface was confirmed to be Na rich by the EDS data with thickness varying between 10-25 nm in FIG. 3B. The significant number of lighter streaks were also confirmed to be Na and travelled through the core via the 2D planes and diffused across the Co layers. As expected, the EDS data shows that Co and O were present. The center of the particle accommodated a small Na content in the form of Na-phase streaks; still the Na phase and Li phase were separated. The small Na-phase content points to the Li-phase dominating the core of the $(NL)_{0.7}CO$.

Figure 3C:
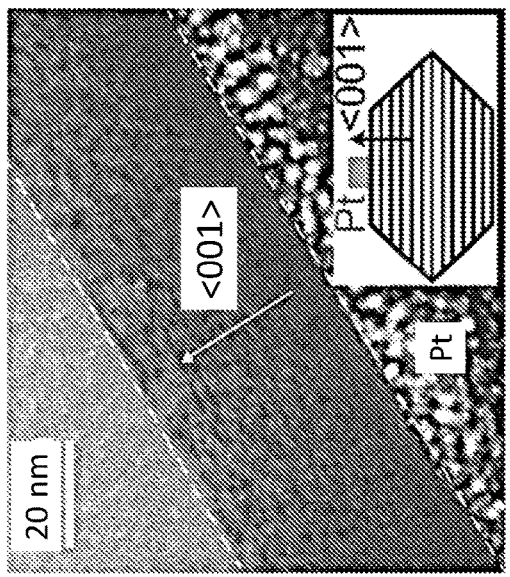

The core shell structure of $(NL)_{0.7}CO$ was confirmed by a second sample thinned at the center of the particle at the terminating $CoO_2$ plane. The STEM HAADF images in FIG. 3C show three of the four distinct regions in FIG. 3A that were confirmed to be Pt coating, Na-shell, and Li-core by EDS. The surface Na-phase thickness varies 35-45 nm. The atomically sharp boundary in contrast marks the Na-phase transition to the Li-phase set by a $CoO_2$ layer. From both STEM samples, the Na-phase constitutes the particle surface, indicating a core-shell structure with Li-phase as the core.

Figure 3E:
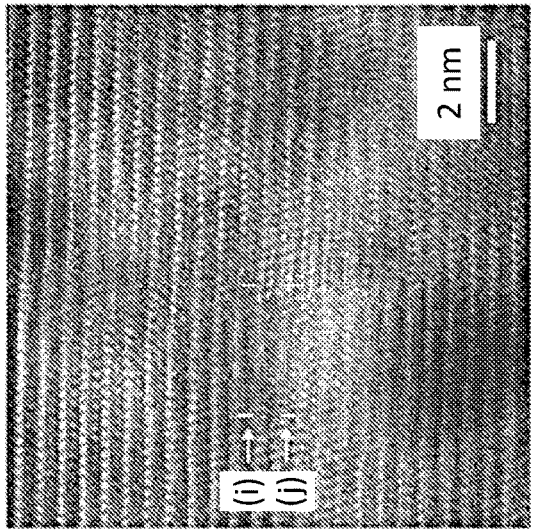
Figure 3D:
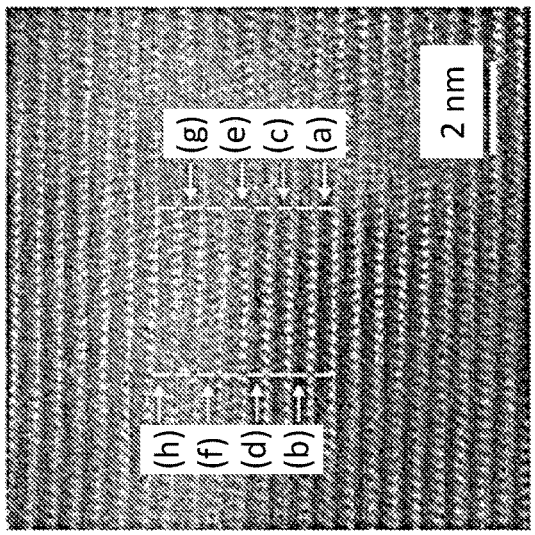
Figure 3F:
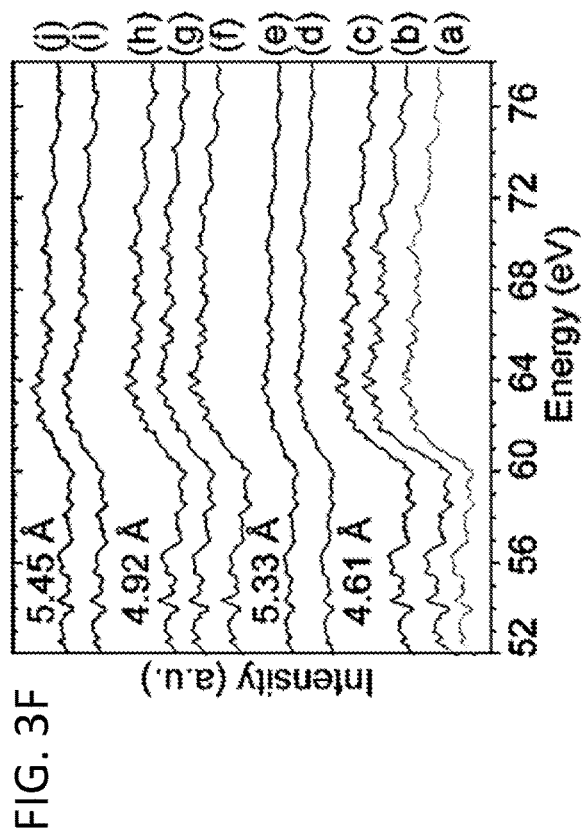
Figure 3H:
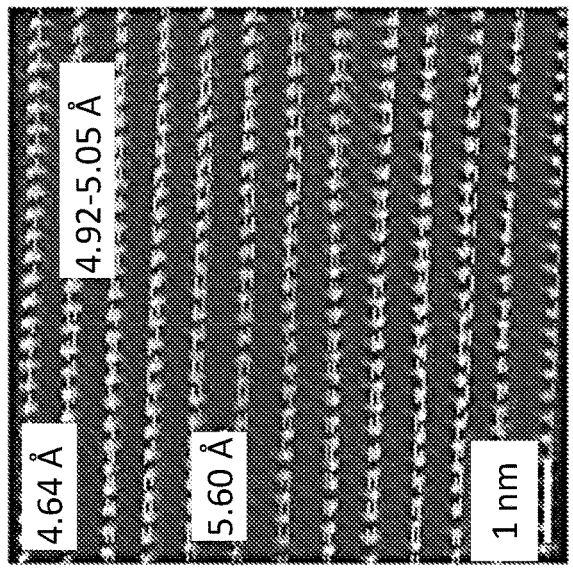
Figure 3G:
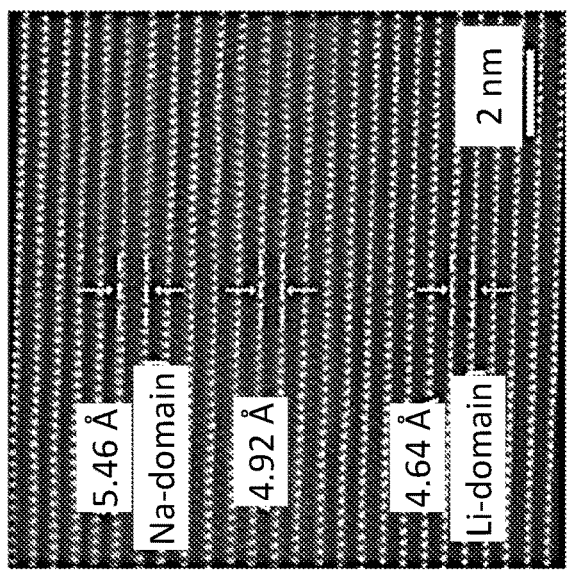
Figure 3I:
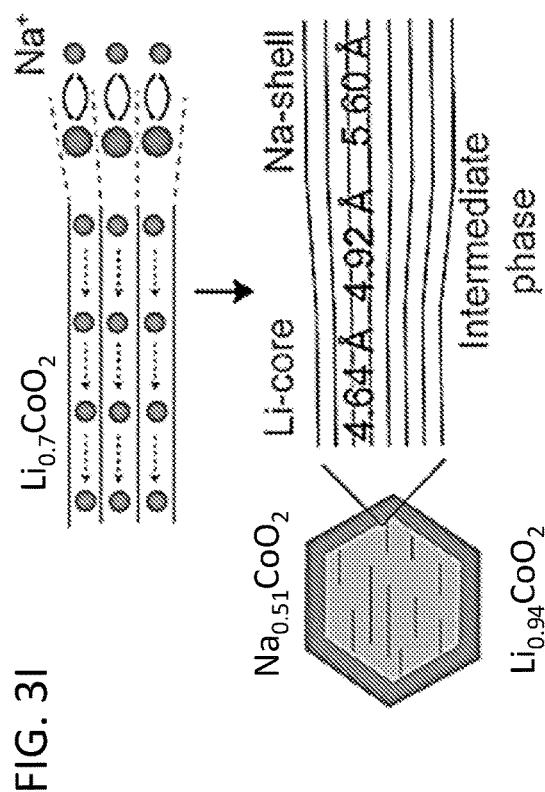

The compositions of the observed Li and Na regions were further determined. The EDS provides evidence that, despite coexisting in the same particle, the Li-phase does not contain Na. Still, Li may exist in the Na-phase or an additional phase. The Li presence was probed with EELS both in the core near the Na-phase streaks (FIG. 3D) and in the shell (FIG. 3E). The EELS spectra in FIG. 3F shows the superposition of the Li—K and Co-$M_{2,3}$ edges in the low-loss region. The spectra reveal three distinct sets of data that are grouped based on overall intensity and the onset edge slope between 59.1 and 61.9 eV. The overall intensity will be larger when Li and Co are present due to the superposition of their signals, and the onset slope will be steeper for a larger Li composition due to those energies being more characteristic of the Li—K edge. The first set, spectra (a)-(c) on FIG. 3F, contains the spectra with the largest overall intensity and the largest onset edge slope, indicating the highest Li composition. The layers (a)-(c) on FIG. 3F have a 4.61 Å layer spacing that corresponds well with the expected $Li_{0.94}CoO_2$ layer spacing from XRD (4.62 Å). The second set, spectra (f)-(h) on FIG. 3F, contains the spectra with a lower overall intensity and a flatter onset edge slope, indicating a decrease in the Li composition. The layers (f)-(h) on FIG. 3F have a 4.92 Å layer spacing, indicating an intermediate layer spacing relative to the expected $Li_{0.94}CoO_2$ and $Na_{0.51}CoO_2$ phase layer spacings. The third set, spectra (d), (e), (i), (j) on FIG. 3F, contains the spectra with the smallest overall intensity and smallest onset edge slope. The layers (e), (d) on FIG. 3F have a 5.33 Å layer spacing, and layers (i), (j) on FIG. 3F from the shell have a 5.45 Å layer spacing that corresponds well with $Na_{0.51}CoO_2$ phase layer spacing (5.57 Å), indicating minimal Li presence. The Li-phase, Na-phase, and their transition was further characterized with high resolution STEM. FIG. 3G ([110] zone axis) displays a clear image of the planes of Co atoms. Transition across the cobalt oxide layers was accomplished through an intermediate phase with spacing of 4.92-5.05 Å, from Na-phase (5.60 Å) to Li-phase (4.64 Å). The existence of multiple phases in a single layer leads to nonuniformities in layer spacing, especially in the intermediate phase (FIG. 3H). These nonuniformities are caused by strain from Li-phases and Na-phases separated in the same plane and complexities of the strain fields in a single multiphase particle. With the STEM characterization, it was summarized that the $(NL)_{0.7}CO$ structure displays a Na-phase ($Na_{0.51}CoO_2$) at the particle surface, a Li-core ($Li_{0.94}CoO_2$) with discrete Na-phase, and an intermediate phase for the transition (FIG. 3I). The $Li_{0.94}CoO_2$ and $Na_{0.51}CoO_2$ phases are exclusive to Li and Na ions, respectively.

Li Selectivity in Mixed Li and Na Solutions

Next, the selectivity of the core-shell $(NL)_{0.7}CO$ material for the selective extraction of Li ions from aqueous solutions was investigated. 1 M Na$^+$ electrolyte spiked with different concentrations of Li$^+$ was used for the tests. The $(NL)_{0.7}CO$ electrode was cycled 20 times before the final intercalation (extraction). The 20 times cycling was to establish an equilibrium state between the electrode and the solution to avoid recovery of structural Li from the original $(NL)_{0.7}CO$. Then the electrode was moved into a fresh solution for recovery and followed by Inductively Coupled Plasma-Mass Spectroscopy (ICP-MS) measurement of Li and Na concentrations. As shown in FIG. 4A, $(NL)_{0.7}CO$ demonstrated high Li$^+$ recoverability in these solutions via electrochemical extraction at 0.6 C rate. The recovery was consistently high from solutions containing Li to Na ratios 1:100, 1:1,000, 1:5,000, 1:10,000, and 1:20,000 with a recovered mol ratio Li to (Li+Na) of 89.5±0.6%, 92.7±2.2%, 89.3±3.0%, 87.9±1.1%, and 88.4±0.5%, respectively, corresponding to a Li:Na of ~8.5:1, 12.8:1, 8.3:1, 7.2:1, and 7.6:1 in the recovery solution. The accuracy of ICP-MS measurement of selectivity was confirmed by high agreement with the measured cations and expected value from the electrochemical extraction reported as percentages of ions measured/ions deintercalated all within 7% of each other (FIG. 4B). The ratios were most likely below 100% due to adsorption of deintercalated cations onto the electrode. The $(NL)_{1-x}CO$ electrodes reached Li selectivity factors as high as $1.5 \times 10^5$ in the 1:20,000 solution, a similar ratio to seawater. These results show the capability for high Li recoverability from real seawater using the $(NL)_{1-x}CO$ electrode.

Figure 4D:
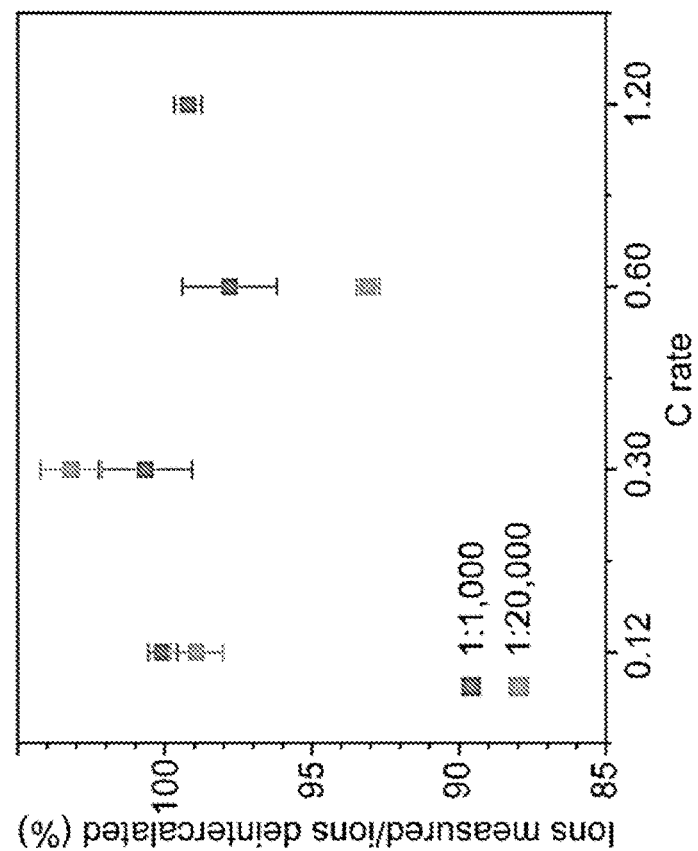
FIGS. 4C-4D show performance results for various C rates over the same state of charge range. The cycled solutions were Li to Na ratio 1:1000 and 1:20,000. Recovery (FIG. 4C) and efficiency (FIG. 4D) are reported the same as is FIGS. 4A and 4B, respectively.
Figure 4C:
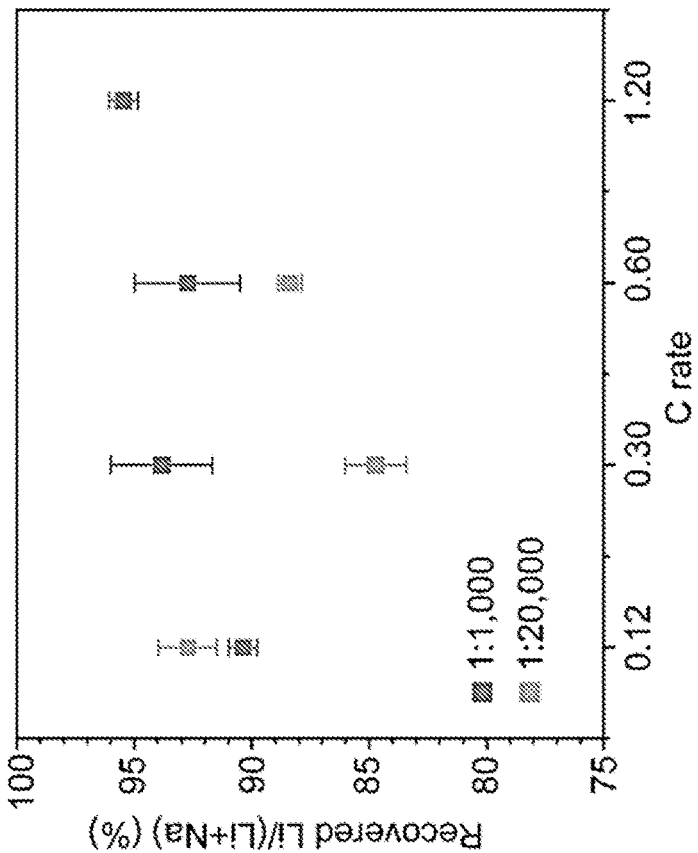

The rates for electrochemical extraction were varied for the solutions with Li to Na ratio 1:1,000 and 1:20,000. Rate was important because it is related to the productivity of the Li mining method. No strong dependence of the Li recoverability on the rate over the same state of charge was observed. For rates between 0.12 C and 1.20 C, 90.4±0.6%, 93.8±2.2%, 92.7±2.2% and 95.4±0.6% Li to (Li+Na) mol ratios were measured for 1:1,000 Li to Na and 92.7±1.2%, 84.7±1.3%, and 88.4±0.5% were measured for 1:20,000 Li to (Li+Na) as shown in FIGS. 4C and 4D. The increased overpotential from faster rates increased the probability of OER, which prevented the measurement in 1:20,000 solution at a 1.2 C rate. The electrochemical extraction rate can be adjusted without a Li selectivity trade-off. Therefore, extraction can be accomplished at higher rates as long as the overpotential is not high enough for OER. Additionally, the high selectivity is retained in seawater-like concentrations of 0.49 M 1:20,000 Li:Na at 0.60 C rate. These results reveal the efficient Li extraction capabilities from seawater of layer gradient spacing $(NaLi)_{1-x}CoO_2$.

Characterization During Co-Intercalation

Figure 5A:
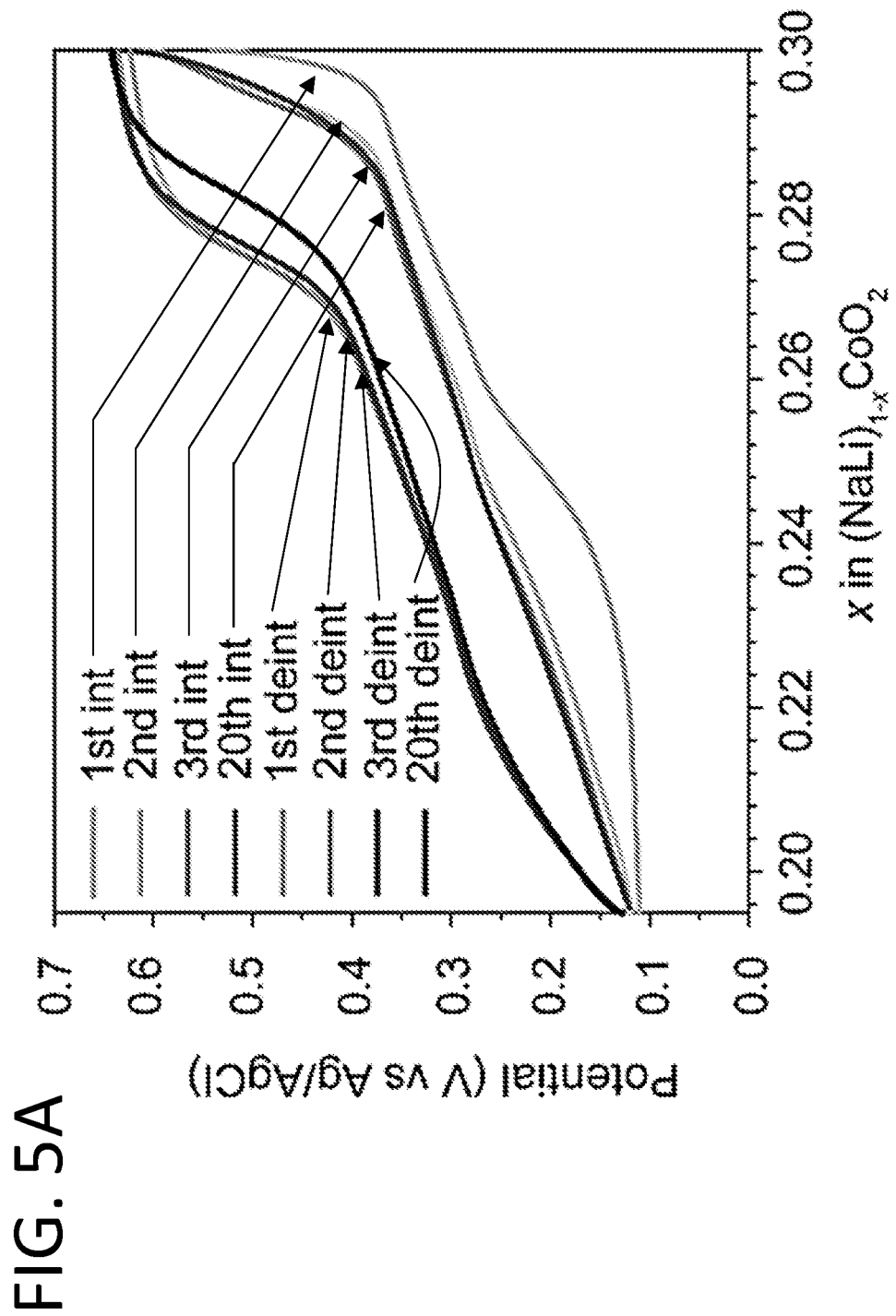
FIGS. 5A-5D show phase and composition changes upon cycling in aqueous solution with a Li to Na ratio of 1:1,000 for $Li^+$ recovery.

To understand and confirm the high selectivity using $(NL)_{0.7}CO$, a series of structure and composition analyses were conducted during the 20 cycles in 1:1,000 solution. In the potential curve (FIG. 5A), the first intercalation from states of charges x=(0.300 to 0.195) for $(NaLi)_{1-x}CoO_2$ reveals a departure from LCO cycling behavior in pure $Li^+$ electrolyte. The $(NaLi)_{1-x}CoO_2$ potential curves have a greater range and more slope changes than $LiCoO_2$ cycling in a pure $Li^+$ electrolyte due to both phase transformations and a lower half cell potential from a dilute $Li^+$ concentration. The potential reaches a similar voltage to $Na_{0.51}CoO_2$ in a Na-ion battery (~0.1 V vs. Ag/AgCl) at the end of intercalation but overall remains at a higher voltage, possibly due to the co-existence of $Li_{0.94}CoO_2$ phase and Li ions being the major charge carrier ions. The intercalation curves following the $1^{st}$ intercalation indicate a permanent change in the structure, as they had shifted to higher potentials and were now characterized by two, new shallower slopes, $0.195 \leq x \leq 0.245$ and $0.245 \leq x \leq 0.287$. As the number of cycles increased, the intercalation/deintercalation curve hysteresis decreased, which corresponds to a decrease in the free-energy barrier representing the interfacial energy and coherency strain energy in a single, multiphase particle. The electrochemical curve showed a good reversibility for the material. To reveal the $(NL)_{1-x}CO$ chemical composition change during cycling, parallel samples were sacrificed at different intercalation/deintercalation cycles, and the electrodes were dissolved for ICP-MS measurement.

Figures 5B, 5D:
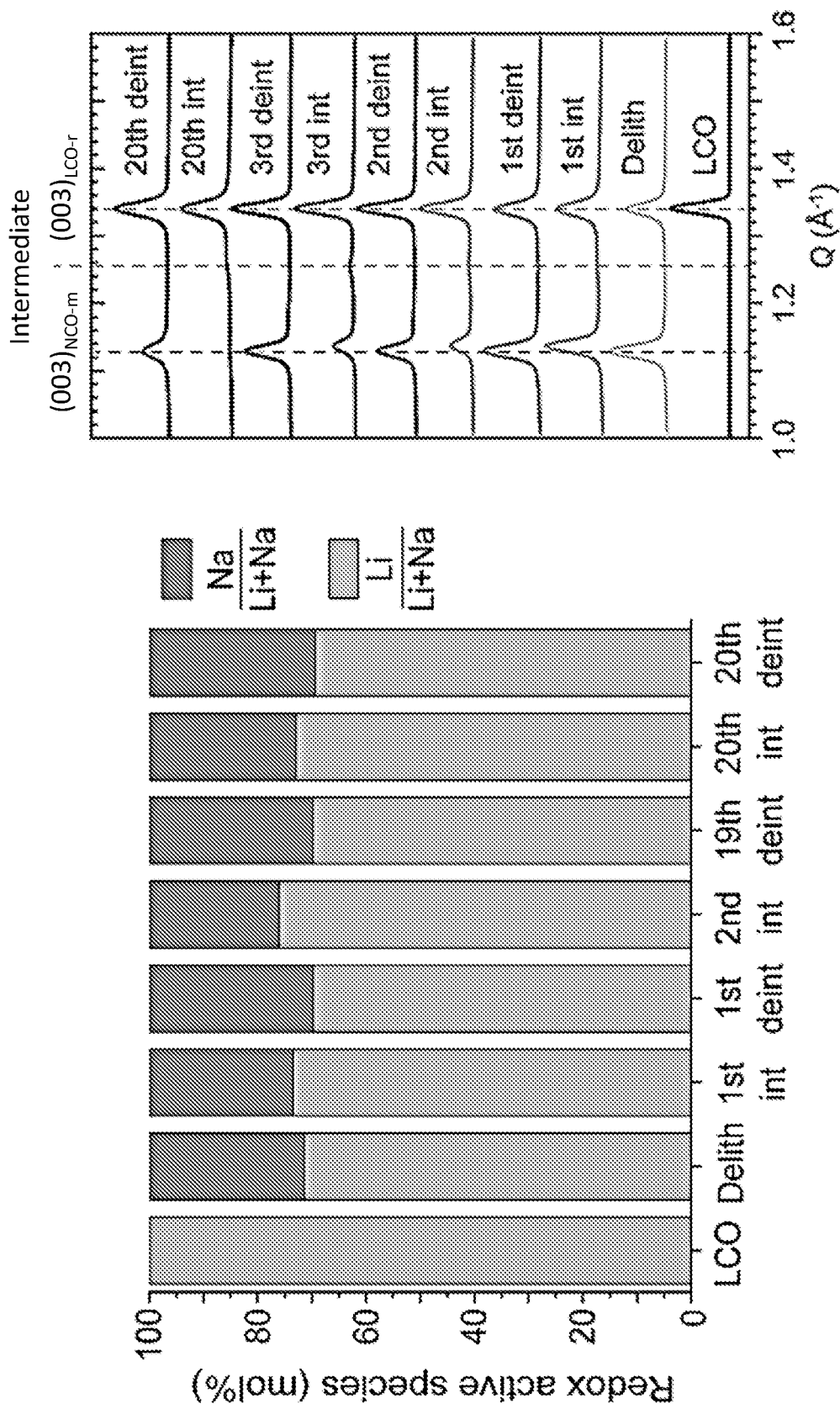

In FIG. 5B, the LCO transformed into $Li_{0.50}Na_{0.20}CoO_2$ after the initial deintercalation. The Li content was higher than that predicted using phase equilibrium between $Li_{0.94}CoO_2$ and $Na_{0.51}CoO_2$ for the initial deintercalated $(NaLi)_{0.7}CoO_2$. This is due to the formation of the intermediate phase (shown in FIGS. 3G-3I), which has a high Li content. Over the 20 cycles, the Li to Na ratio in the material was ~7:3 with an oscillating pattern. Comparing samples in close time series, Li content was observed to increase upon intercalation and decrease upon deintercalation (FIG. 5B). This trend confirms Li constituted the majority of charge transfer from the $Li^+$ spiked solutions. The Li might not be intercalated directly into the $Li_{0.94}CoO_2$ phase due to the increase in migration barrier at low vacancy compositions. Even at a low C rate, the capacity cannot be fully used in a 1:1,000 aqueous solution for a $(NL)_{1-x}CO$ when x=0.06 or x=0.04. A Na-phase does not form in the low vacancy state as expected.

Figure 5C:
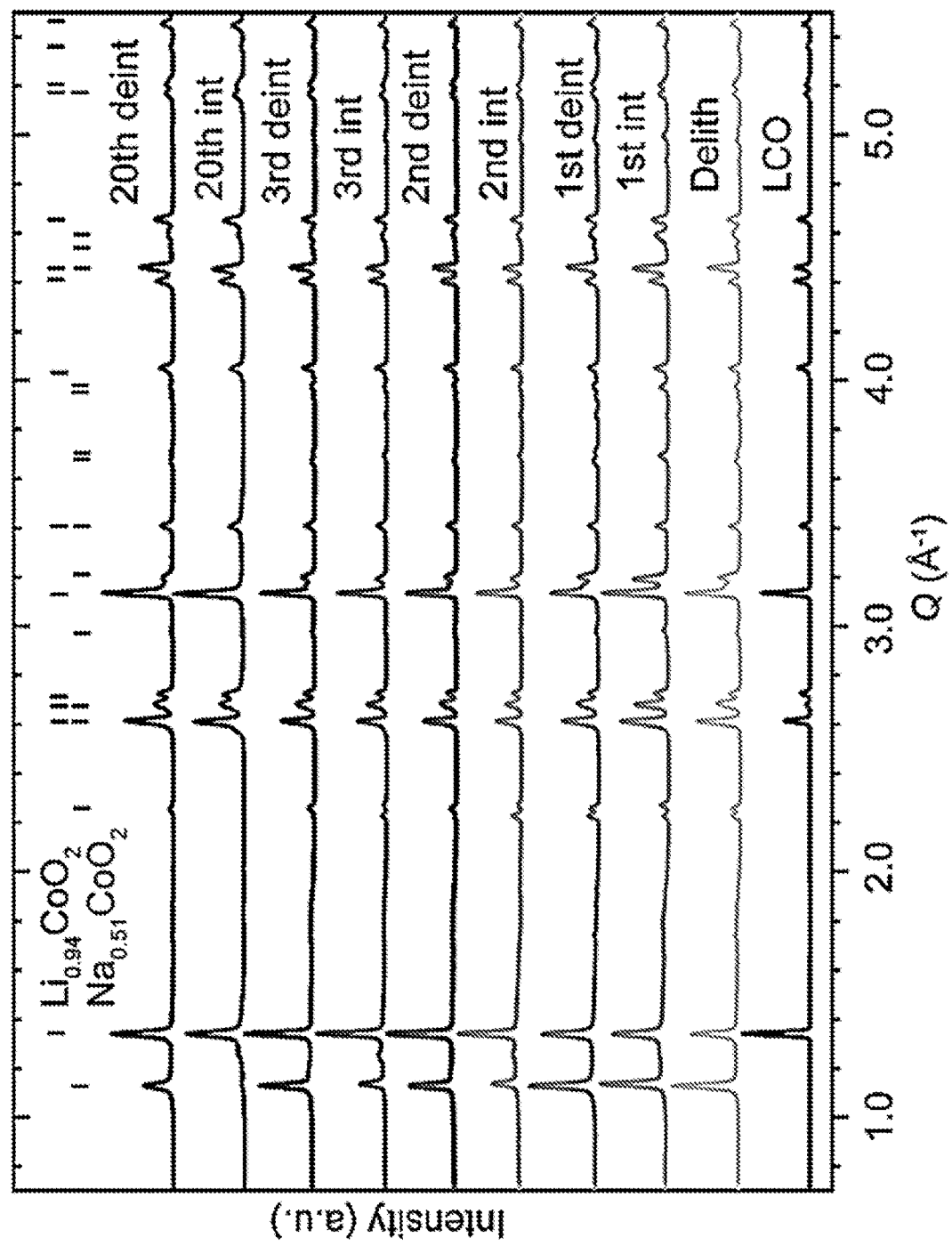

Moreover, synchrotron XRD confirms the oscillating pattern of material changes during cycling. The spectra in FIG. 5C show changes in the relative intensities of the Na-phase and Li-phase peaks, notably the $(003)_{NCO-m}$ and $(003)_{LCO-r}$ peaks (FIG. 5D). The $(003)_{NCO-m}/(003)_{LCO-r}$ ratio kept decreasing during each intercalation until the $(003)_{NCO-m}$ peak almost completely disappeared by the $20^{th}$ intercalation but continued to partially reverse after deintercalation when more vacancies were formed. The Na-phase had an apparent change in c-lattice parameter with each intercalation and deintercalation. The $(003)_{NCO-m}$ peak shifted to the same higher Q value, 1.137 $Å^{-1}$ during intercalation; thus, indicating a decrease in the c-lattice parameter and a compression of the Na-phase layers. Upon deintercalation, the $(003)_{NCO-m}$ peak shifted back to its original position, 1.127 $Å^{-1}$, and the Na-phase layers expanded again.

The shell Na-phase maintained a Na composition, despite a dynamic phase volume, that stabilized the structure by limiting further ion-exchange between Li in the $(NL)_{1-x}CO$ and Na in the solution. Concurrently, the $(003)_{LCO-r}$ peak remained in the same position, showing no signs of a change in layer spacing. This consistent and small layer spacing of the core Li-phase prevented Na intercalation. For a $L_{1-x}CO$ material, there was no stabilizing Na-phase shell to form the electrode-electrolyte interface. When $L_{0.7}CO$ was used for intercalation in the 1:1000 solution, the Na ion-exchange and intercalation led to a decrease in the Li composition of the electrode and a significant increase of the Na composition. The differences in the $1^{st}$ intercalation curve are due to differences in the initial material and ongoing Li/Na ion exchange in the $L_{1-x}CO$ material. This reveals that the Li phase alone will not provide high selectivity during co-intercalation.

Interestingly, a new peak appeared that varied between 1.255 and 1.267 $Å^{-1}$ for every intercalation step (FIG. 5D) and then disappeared again upon each deintercalation. This peak had a low intensity and had no accompanying peaks and thus provided little information for phase determination. This peak corresponds to a 4.93 to 5.02 Å d-spacing, which matches well with the intermediate layer spacing regions from the core-shell $(NL)_{0.7}CO$ STEM images. The peak growth implies an increasing volume of the intermediate phase and its increased significance in a particle. During the cycling, the preferred Li intercalation may enable the conversion of the Na-phase into the intermediate phase, which then precipitates out the Li-phase. Because the intermediate phase had a layer spacing well below the 5.57 Å Na-phase layer spacing, the energy barrier for layer expansion limited Na intercalation into the intermediate phase. The structural evolution led to a dominant intermediate phase and Li-phase over the Na-phase that enabled high Li selectivity. The intermediate phase had the important role of storing extracted Li and limiting the large Na ion via its small layer spacing. Similar trends were observed in the intercalation/deintercalation curve and XRD spectrum for the 1:20,000 solution and thus support the same phase transformations in varying $Li^+$ concentrations.

Experimental Procedures

Electrode Preparation

The $LiCoO_2$ (LCO, MTI Corp.) electrodes were prepared by casting a slurry of $LiCoO_2$, Super P carbon black, and polyvinylidene fluoride with a mass ratio of 80:10:10 in N-methyl-2-pyrrolidone. The electrode slurry was drop casted on a 1.25×1 $cm^2$ geometrical surface of a carbon cloth (ELAT-H, Fuel Cell Etc.) current collector of 5×1 $cm^2$ and dried on a hotplate at 100° C. overnight. The other end of the carbon cloth was connected to a Pt clamp. The active material mass loadings ranged between 7-12 mg $cm^{-2}$. $NaFePO_4$ counter electrodes were made with the same slurry compositions as above by first galvanostatically delithiating $LiFePO_4$ (LFP, MTI Corp.) in an aqueous 1 M NaCl solution at a C/2 rate until reaching a 0.5 V vs Ag/AgCl voltage cutoff and then sodiating in a new, aqueous 1 M NaCl solution at a C/60 rate until reaching a −0.6 V vs Ag/AgCl voltage cutoff. A carbon felt (Alfa Aesar) disk with a 0.9525 cm diameter and 3.18 mm thickness were connected to a Ti wire and coated with the electrode slurry and dried on a hotplate at 100° C. The active material mass loading ranged between 60-70 mg $cm^{-2}$. An Ag|AgCl|KCl (4.0 M) reference electrode and a graphite rod counter electrode were used in a 3 neck round bottom flask with 60 mL of solution for the delithiation and sodiation. $N_2$ was continuously bubbled into the solution to displace dissolved $O_2$. All electrochemical operations were performed with a BioLogic VMP3 workstation. The sodiated $NaFePO_4$(NFP) counter electrodes were paired with the delithiated $(NaLi)_{1-x}CoO_2$ electrode for galvanostatically cycling in the 600 mL of synthetic brine/seawater solutions. The synthetic brine/seawater contained a varying amount of LiCl (10 mM, 1 mM, 200 μM, 100 μM, and 50 μM) in an aqueous 1 M $Na^+$ ($Cl^-$, $OH^-$) pH 11.5 solution.

Electrochemical Tests

The initial delithiation of LCO was done in a 3 neck round bottom flask with an Ag|AgCl|KCl (4.0 M) reference electrode, a graphite rod counter electrode, and 60 mL of electrolyte solution. The aqueous electrolyte solutions consisted of either 1 M LiCl pH 7 or 1 M $Na^+$ ($Cl^-$, $OH^-$) pH 11.5. For the samples delithiated in 1 M LiCl in FIGS. 2A-2C, the LCO electrodes were galvanostatically delithiated at a 0.6 C rate for various times. The delithiated electrodes were rinsed with DI water and dried under vacuum at 60° C. for 1 hour. The samples were then characterized with XRD as shown in FIG. 2A. These samples were then soaked in an aqueous 1 M Na+(Cl−, OH−) pH 11.5 solution for 16 hours. The electrodes were then rinsed with DI water and dried under vacuum at 60° C. for 1 hour. The samples were then characterized with XRD as shown in FIG. 2B.

For all other electrochemical tests, samples were prepared by delithiating LCO electrodes in an aqueous 1 M $Na^+$ ($Cl^-$, $OH^-$) pH 11.5 solution to create the $(NaLi)_{1-x}CoO_2$ ($(NL)_{1-x}$CO) electrodes. Then, they were rinsed in three different 60 mL 10 μM KOH (aq.) solutions for 30 mins with continuous $N_2$ bubbling to remove excess adsorbed cations from the solution. For the sample for STEM (FIGS. 3A-3I), the $(NL)_{1-x}CO$ electrode was washed with DI water, vacuum dried at 60° C. for 1 hour, and then stored in an Ar glovebox. For the recovery measurements (FIGS. 4A-4D), the $(NL)_{0.7}CO$ was rinsed with DI water and transferred into 600 mL of the synthetic brine/seawater solution. The NFP replaced the graphite rod as the counter electrode. The electrode was cycled for varying C rates over the same 19.5%-30% state of charge range for 20 cycles followed by a final intercalation to 19.5% state of charge. The sample was then rinsed in three separate 60 mL 10 μM KOH (aq.) solutions for 30 mins with continuous $N_2$ bubbling to remove excess adsorbed cations from the solution. The electrode was then moved to 60 mL 30 mM $K^+$ ($Cl^-$, $OH^-$) pH 11.5 solution with a graphite counter electrode and bubbling $N_2$. The electrode was deintercalated at the same rate as the cycling of the sample to 30% state of charge, and then the recovery solution was analyzed via inductively coupled plasma-mass spectroscopy (ICP-MS).

For the cycled electrode composition and XRD data (FIGS. 5A-5D), the cycling was stopped at 19.5% SOC for intercalation and 30% SOC for deintercalation for a given cycle as labeled. The dissolved samples were rinsed with flowing DI water to remove excess adsorbed cations from the solution. The working electrodes were then placed in aqua regia acid for 72 hours. The acid samples were diluted and then analyzed via ICP-MS. The samples for synchrotron radiation XRD were rinsed in DI water, dried under vacuum 60° C. for 1 hour, and then covered in Kapton tape.

XRD Characterization

Figure 2C:
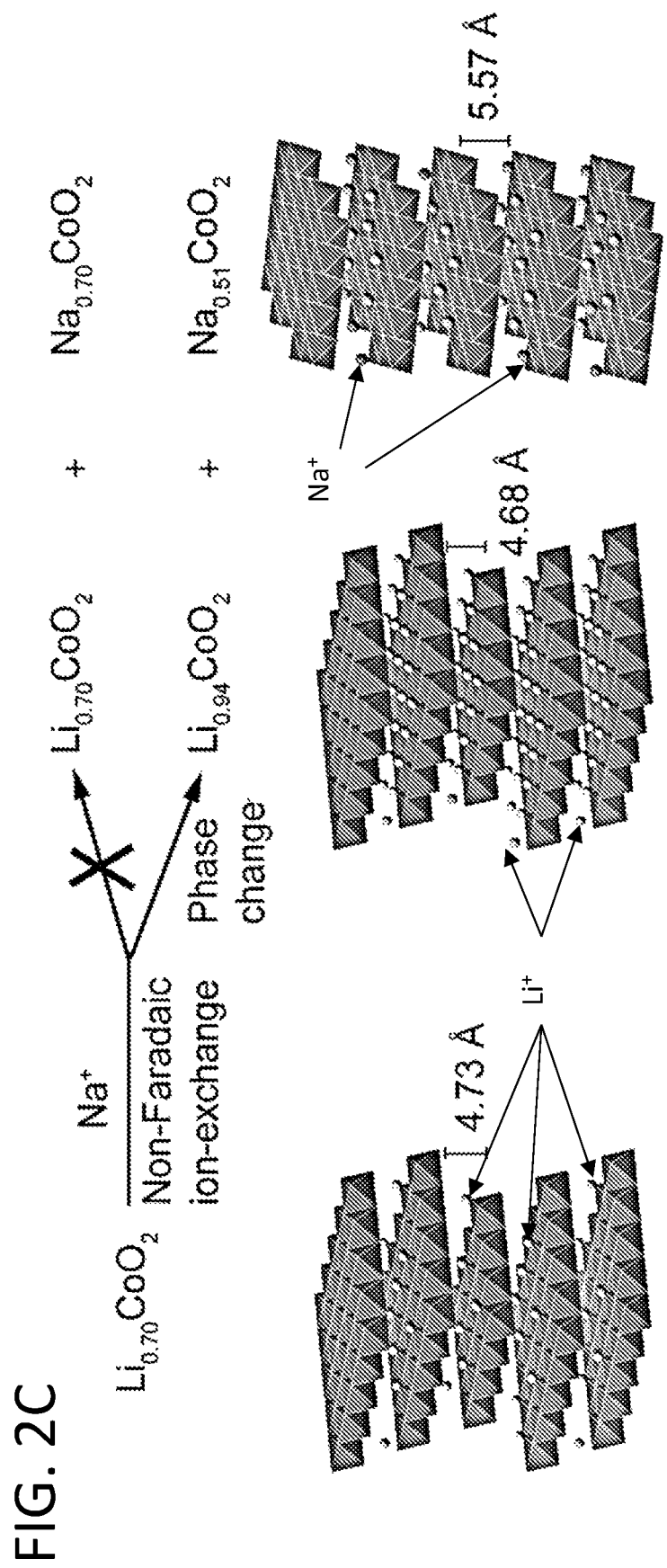

The XRD patterns in FIGS. 2A-2C were measured with a Bruker D8 Discover GADDS with Vantec-2000 2-Dimensional detector at a frame range of 20° (2θ) for 10 min/frame at a monochromatic X-ray incident beam of 0.15406 nm. All XRD spectrum intensities were scaled to the same range. The synchrotron radiation XRD for most of the samples was measured at Beamline 11-BM of Advanced Photon Source at Argonne National Laboratory with the ultrahigh resolution powder XRD and with monochromatic X-ray incident beam of 0.457884 Å. All XRD spectrum intensities were scaled to the same range. Samples labeled Delith, $1^{st}$ int, $1^{st}$ deint, $20^{th}$ int, and $20^{th}$ deint in FIGS. 5C and 5D were measured at Beamline 11-ID-C of Advanced Photon Source at Argonne National Laboratory with a monochromatic X-ray incident beam of 0.1173 Å. The 2D diffraction patterns were obtained in the transmission geometry using a PerkinElmer large area detector placed downstream at 1.5 m away from the sample. All XRD spectrum intensities were scaled to the same range. For an equal footing comparison between XRD data obtained at both 11-BM and 11-ID-C beamline, an instrumental resolution function for the setup used at 11-ID-C has been convoluted into the data from Beamline 11-BM (e.g., peak smearing).

In-situ synchrotron radiation XRD integrated with electrochemical control was done at beamline 12-ID-D of Advanced Photon Source at the Argonne National Laboratory. In the experiment, a monochromatic X-ray incident beam with a wavelength of λ=0.6199 Å was introduced into a custom-designed electrochemical sample cell adopted for in situ measurements. The sample cell frame and all components were made of strong corrosion-resistant polymer Kel-F. LCO on carbon cloth electrode with 12.48 mg $cm^{-2}$ of active material was placed within the central position of the in situ electrochemical cell between two sealed Kapton windows with a gap of between 0.5 to 1 mm, which permits the electrolyte to be purged through the active LCO/carbon cloth layer. The two-dimensional synchrotron radiation XRD diffraction patterns were collected with a Detrics Pilatus-100K photon counting area detector (pixel size 172× 172 microns), which was located at about 150 mm after the sample position. The original 2D diffraction patterns were processed and integrated with FIT2D software to obtain plots of diffraction intensity vs. Q (scattering vector). In the course of in situ experiments, fresh 1 M $Na^+$ ($Cl^-$, $OH^-$) pH 11.5 solution was continuously pumped through the sealed sample cell to maintain a thin liquid film at 5 mL/min flow rate via a programmed NE-300 syringe pump. At the same time, galvanostatic delithiation was recorded via a Gamry Reference 600 potentiostat at 1.2 C rate for 33 min using an Ag/AgCl reference electrode and NaFePO$_4$ coated on a graphite counter electrode.

ICP-MS Characterization

The recovery and dissolved sample compositions were diluted in a 3% HNO$_3$ matrix and measured with either a Thermo iCAP Q ICP-MS or a Thermo iCAP RQ ICP-MS.

SEM/FIB Sample Preparation

The (NL)$_{1-x}$CO electrode sample for TEM was prepared with a focus ion beam (FEI Helios NanoLab). The samples were prepared via the standard lift-out procedure which includes coating the surface with a protective 1.2 μm thick Pt layer to avoid Ga beam damage. The sample was attached to a Cu half grid and thinned to 70 nm using a 30 kV and 5 kV Ga ion beam. A final sample cleaning was performed at a 2 kV Ga ion beam to remove any surface damage.

STEM Characterization

STEM images were acquired using JEOL ARM 200F equipped with a cold field emission source. HAADF images were acquired at 200 kV with a less than 0.8 Angstrom spatial resolution. The HAADF detector angle was 90-270 mrad to give Z contrast images. The LAADF detector angle ranged between 40-120 mrad. EELS spectra were acquired by Gatan GIF Continuum ER with a dwell time of 0.03 s per pixel. EDS spectra imaging was acquired using Oxford X-Max 100TLE windowless SDD detector with a dwell time of 6.14 ms.

Example Appendix

Potential Curve Behavior

The Nernstian behavior of LCO was prominent when comparing the potential curves of LCO deintercalation into Na$^+$ solution and Li$^+$ solution. For the 1 M Na$^+$ solution, the low Li$^+$ concentration in the solution at the beginning of the deintercalation resulted in a large reaction quotient, which shifted the half-cell potential to lower values. The relatively large change in Li$^+$ concentration in the solution caused the reaction quotient to decrease as the reaction proceeded, which caused a more slopped potential relative to deintercalation in the Li$^+$ solution.

XRD Peak Broadening

The comparison between the delithiated LCO in 1 M Li$^+$ and 1 M Na$^+$ reveals peak broadening for the (NaLi)$_{0.70}$CoO$_2$ XRD spectrum relative to the Li$_{0.70}$CoO$_2$ XRD spectrum. This broadening is most likely due to the increased microstrain from the increased layer spacing in the Na-phase coupled with lattice mismatch between the two phases, and peak broadening may be due to a decrease in the crystallite size as a result of the phase separation. The Na-phase growth may also be influenced by the mechano-electro-chemical coupling from stress, valency, and concentration gradients within the electrode material.

In Situ XRD

For this phase transformation to occur without changing the net current, the Na$^+$ must diffuse against the applied current and exchange with Li$^+$ in the host structure or the cations exchange when the applied current is 0 mA. In situ XRD allows for the time resolved characterization of the Na/Li phase transformation to determine this mechanism, which was accomplished with the same electrochemical cell as Zhang et al. (Zhang, Z. et al., (2019). J. Mater. Chem. A 7, 23775-23780.) In situ XRD spectra show no evidence of the Na-phase over the entire 33 min delithiation at a 1 C rate. After the delithiation, the XRD measurement was paused for 11 mins so that the electrolyte solution could be replenished. Upon continuing the measurement, the XRD pattern revealed the phase transformation had occurred during the solution exchange process. Despite not capturing the phase transformation in situ, the measurements indicate that the Na/Li exchange occurs when there is no applied current.

Electrochemical extraction methods were performed with either constant current or constant voltage, and the extraction parameter is reported accordingly in Table 1. Recovered Li:Na ratios were determined by measuring elements in the recovery solution except for cases where the Li:Na ratios were determined by measuring the elements in the dissolved electrode. Selectivity is defined as the mol ratio of Li:Na measured in the recovery solution over the initial Li:Na ratio. Results of tests with initial Li:Na ratios at seawater level are highlighted in Table 1 with underlining. Highest selectivity is highlighted in bold.

TABLE 1

Li selectivity over Na with electrochemical insertion (NaLi)$_{1-x}$CO$_2$ electrodes.

| Constant Current (mA g$^{-1}$) | Initial Li:Na | Recovered Li:Na | Selectivity |
|---|---|---|---|
| 82.8 | 1:1,000 (1M Na) | 12.8:1 | 1.3 × 10$^4$ |
| 82.8 | 1:5,000 | 8.3:1 | 4.2 × 10$^4$ |
| 82.8 | 1:10,000 | 7.2:1 | 7.2 × 10$^4$ |
| 82.8 | 1:20,000 | 7.6:1 | 1.5 × 10$^5$ |
| 16.56 | 1:1,000 | 9.4:1 | 9.4 × 10$^3$ |
| 16.56 | 1:20,000 | 12.7:1 | 2.5 × 10$^5$ |
| 41.4 | 1:1,000 | 15.1:1 | 1.5 × 10$^4$ |
| 41.4 | 1:20,000 | 5.5:1 | 1.1 × 10$^5$ |
| 165.6 | 1:1,000 | 20.7:1 | 2.1 × 10$^4$ |
| 82.8 | 1:20,000 (0.49M Na) | 5.3:1 | 1.1 × 10$^5$ |

Figure 6B:
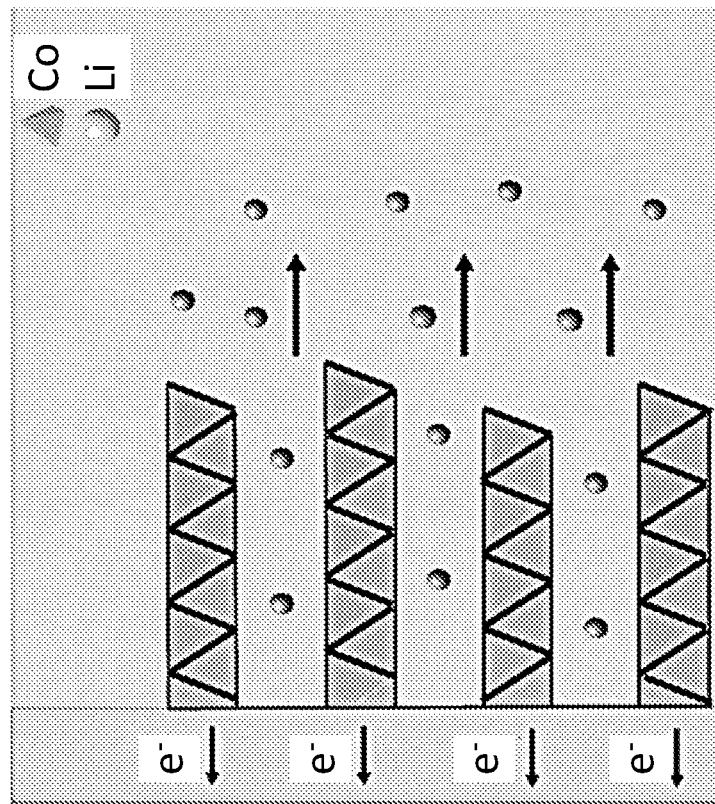
FIGS. 6A-6B show schematics of an extraction and recovery process.
Figure 6A:
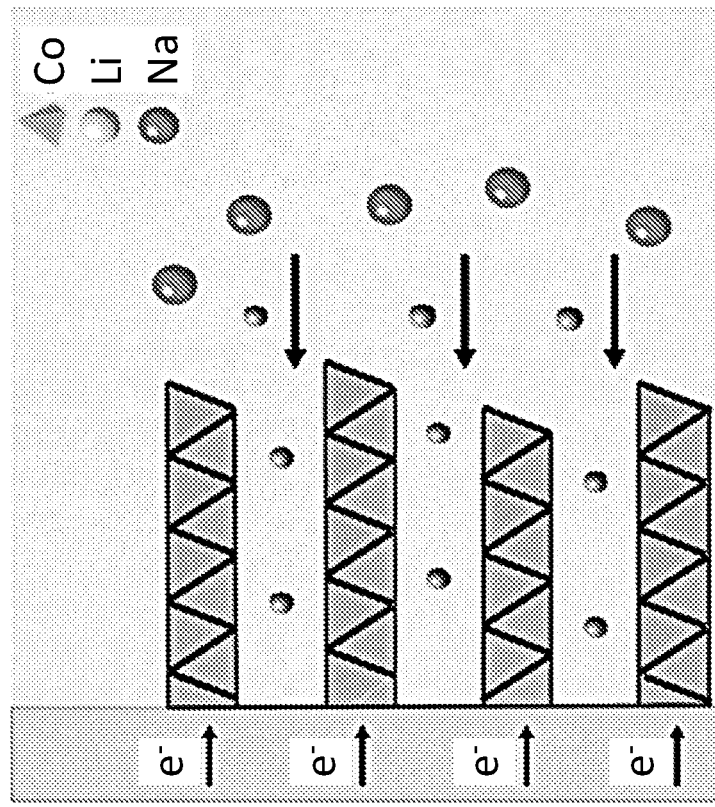

FIGS. 6A-6B show schematics of the extraction and recovery process. FIG. 6A shows that reduction of the host structure Co cations allows Li or Na intercalation from the seawater/brine-like solution. FIG. 6B shows that oxidation of the host structure Co cations allows Li or Na deintercalation into the recovery solution.

Figure 7:
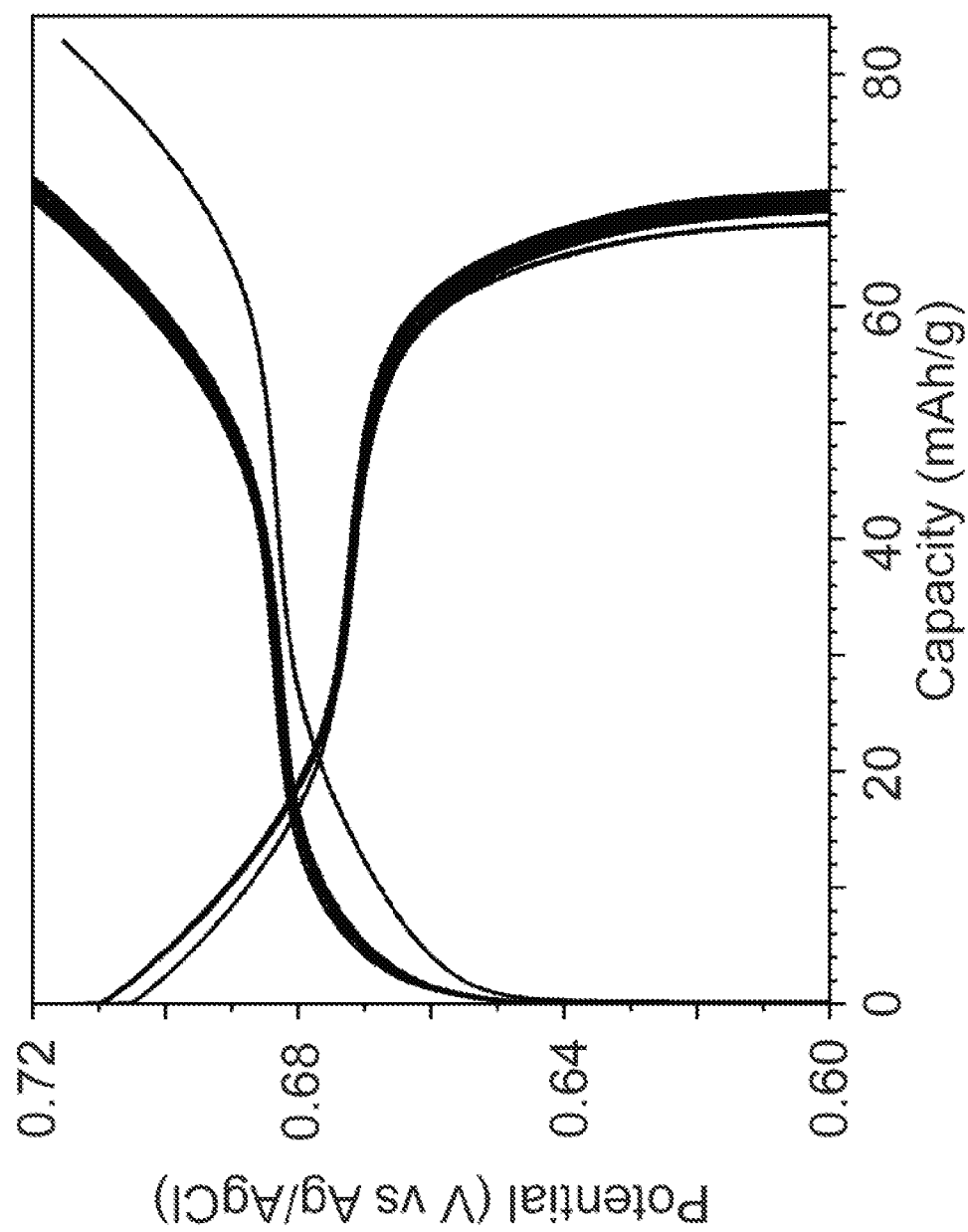
FIG. 7 shows cycle stability of $LiCoO_2$ in aqueous 1 M LiCl. LCO electrode paired with $FePO_4$ counter electrode was cycled for 20 cycles at a 0.6 C rate from 0.6-0.72 V vs. Ag/AgCl. The deintercalation curve with the largest capacity is the $1^{st}$ deintercalation.

FIG. 7 shows cycle stability of LiCoO$_2$ in aqueous 1 M LiCl. LCO electrode paired with FePO$_4$ counter electrode was cycled for 20 cycles at a 0.6 C rate from 0.6-0.72 V vs. Ag/AgCl. The deintercalation curve with the largest capacity is the 1$^{st}$ deintercalation.

FIGS. 8A-8B show comparisons of delithiation of LCO in 1 M Na$^+$ and 1 M Li$^+$ solutions. FIG. 8A shows galvanostatic deintercalation at 0.6 C rate for 1 hour in aqueous 1 M Li$^+$ and 1 M Nat FIG. 8B shows an XRD spectrum for LiCoO$_2$ (black, ICDD PDF: 01-080-4975), Li$_{0.70}$CoO$_2$ (ICDD PDF: 01-076-3173) after delithiation in aqueous 1 M Lit, and (NaLi)$_{0.70}$CoO$_2$ after delithiation in aqueous 1 M Nat Peaks from (NaLi)$_{0.70}$CoO$_2$ are made of a combination of Li$_{0.94}$CoO$_2$ (top, ICDD PDF: 01-076-7878) and Na$_{0.51}$CoO$_2$ (bottom, ICDD PDF: 01-075-7656). The grey and black dashed lines mark the (003)$_{NCO-m}$ and the (003)$_{LCO-r}$, respectively, of the (NaLi)$_{0.7}$CoO$_2$. The (003)$_{LCO-r}$ peak of the Li$_{0.70}$CoO$_2$ is to the left of the black dashed line. The (003)$_{LCO-r}$ peak of the LiCoO$_2$ is to the right of the black dashed line.

Figure 9B:
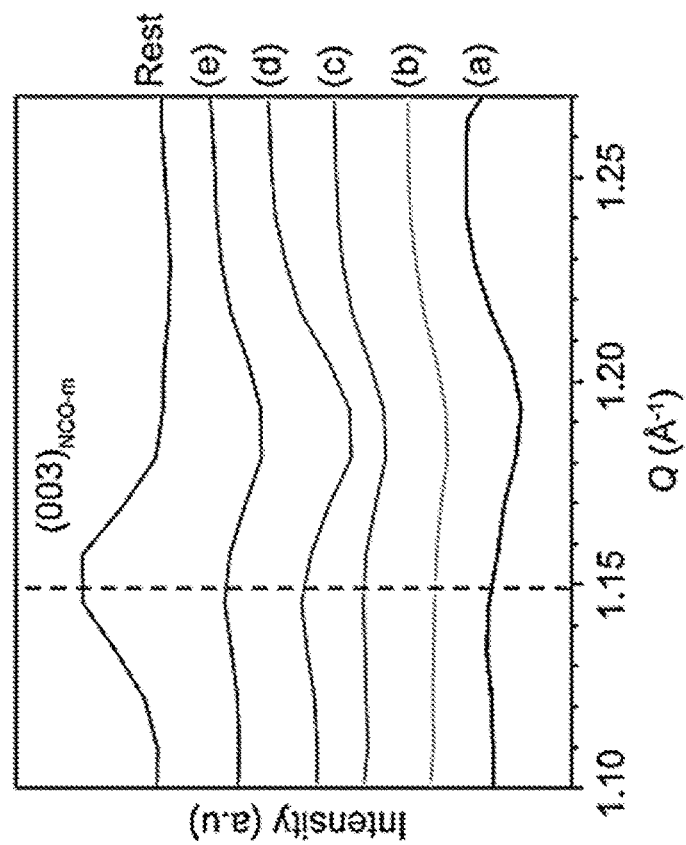
FIGS. 9A-9B show in situ XRD of delithiation of LCO in 1 M $Na^+$ solution.
Figure 9A:
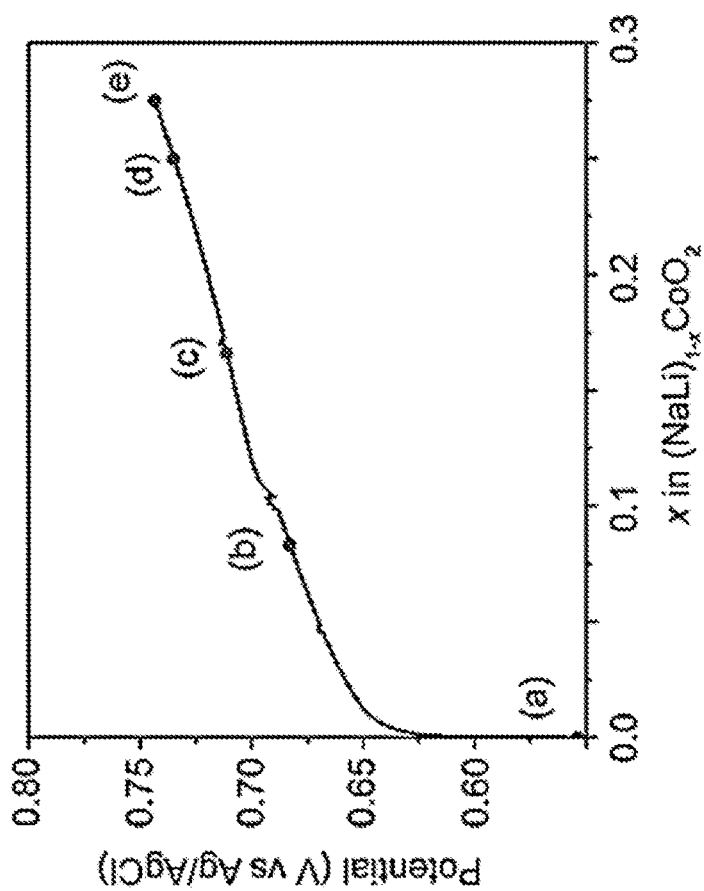

FIGS. 9A-9B show in situ XRD of delithiation of LCO in 1 M Na$^+$ solution. FIG. 9A shows a galvanostatic deintercalation curve at 1 C for 33 min in aqueous 1 M NaCl using the in situ electrochemical cell. Points (a)-(e) mark values of x=0.083, 0.167, 0.25, and 0.275. FIG. 9B shows a detailed XRD spectrum of the Q range for the $(003)_{NCO-m}$ (black dashed line). Traces (a)-(e) correspond to the data points in FIG. 9A. Rest corresponds to the spectrum collected after the 11 min period where no current was applied nor XRD data collected.

Figure 10B:
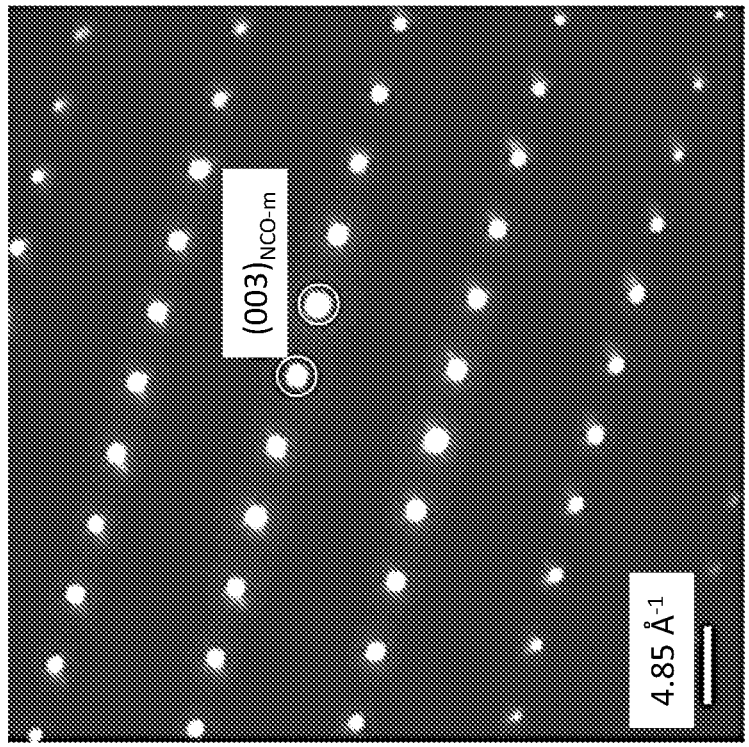
FIGS. 10A-10B show selected area diffraction patterns of a $(NL)_{0.7}CO$ particle. The pattern shown in FIG. 10A is from core with Na-streaks. The pattern in FIG. 10B is from shell.
Figure 10A:
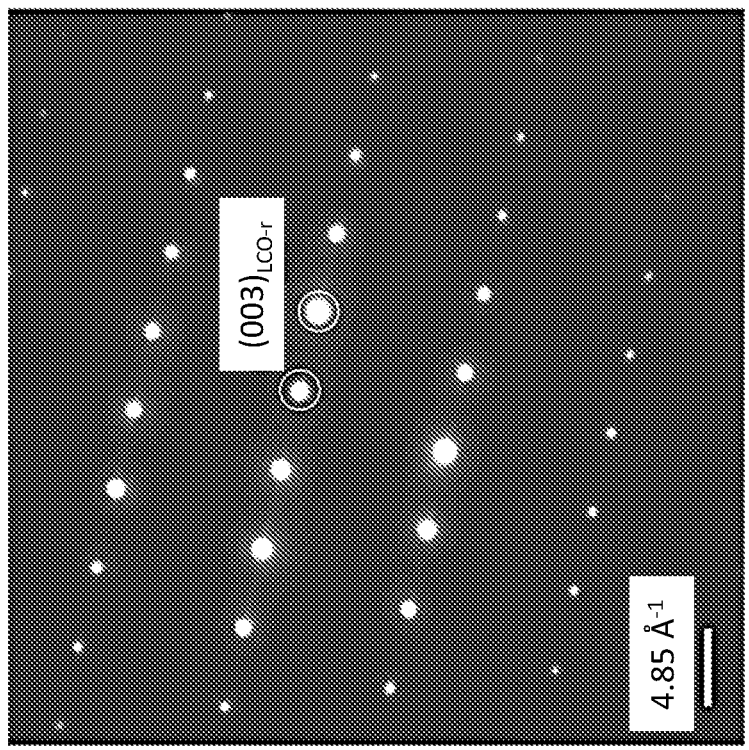

FIGS. 10A-10B show selected area diffraction patterns of a $(NL)_{0.7}CO$ particle. The pattern shown in FIG. 10A is from core with Na-streaks. The pattern in FIG. 10B is from shell. Both images are from along the [110] zone axis. The streaking in diffraction spots in the pattern shown in FIG. 10A is due to the Na-streaks.

FIGS. 11A-11B show STEM LAADF images of a $(NL)_{0.7}CO$ particle at an electrode/electrolyte interface. The image shown in FIG. 11A corresponds to STEM HAADF image in FIG. 3A showing the Na-phase shell and Li-phase core of the $(NL)_{0.7}CO$ particle cut near the electrode/electrolyte interface. Images are along the [110] zone axis. The lighter contrast streaks reveal the layered structure. The image shown in FIG. 11B shows the highlighted square in FIG. 11A. The streak path indicates diffusion along the 2D planes and across $CoO_2$ layers, which should kinetically limit alkali ion transport between layers.

FIGS. 12A-12B show a STEM LAADF image and elemental analysis of $(NL)_{0.7}CO$ near the center of a terminated $CoO_2$ plane. FIG. 12A shows a STEM LAADF image corresponding to the STEM HAADF image in FIG. 3C showing the Na-phase shell and Li-phase core of a $(NL)_{0.7}CO$ particle near the center of the terminated $CoO_2$ surface. Images are along the [110] zone axis. FIG. 12B shows EDS from the core and its corresponding elemental mappings (Na, Co, O, Pt).

Figure 13B:
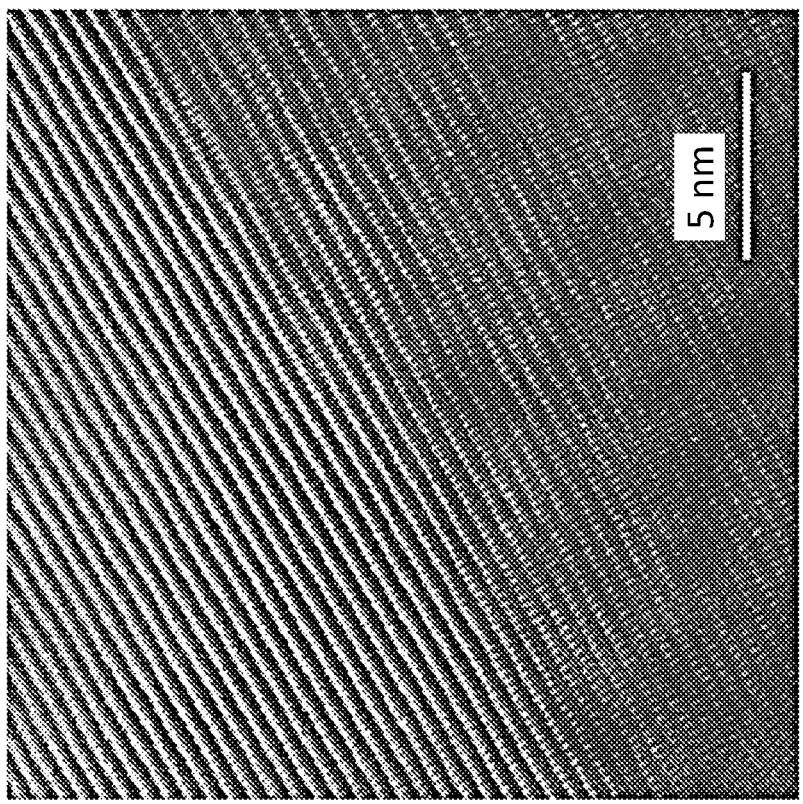
FIGS. 13A-13B show STEM HAADF images of the core-shell of $(NL)_{0.7}CO$ near the center of the terminated $CoO_2$ plane.
Figure 13A:
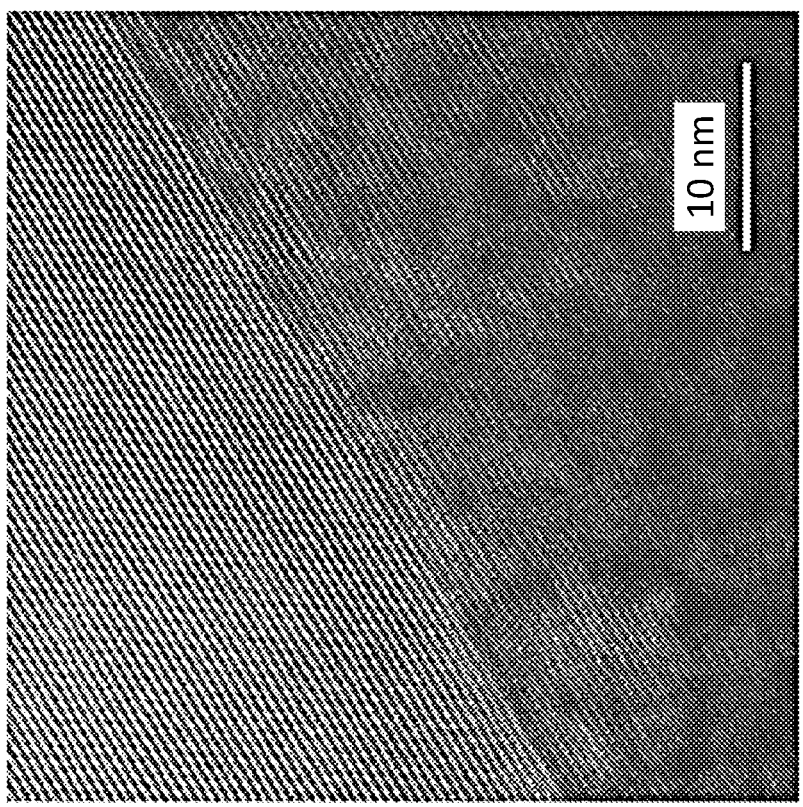

FIGS. 13A-13B show STEM HAADF images of the core-shell of $(NL)_{0.7}CO$ near the center of the terminated $CoO_2$ plane. FIGS. 13A-13B show high resolution STEM HAADF images corresponding to FIG. 3C and FIGS. 12A-12B, showing the atomically sharp transition between the Na-phase shell layers (top, dark contrast) and Li-phase core layers (bottom, light contrast) of $(NL)_{0.7}CO$ particle near the center of the terminated $CoO_2$ surface.

Figure 14B:
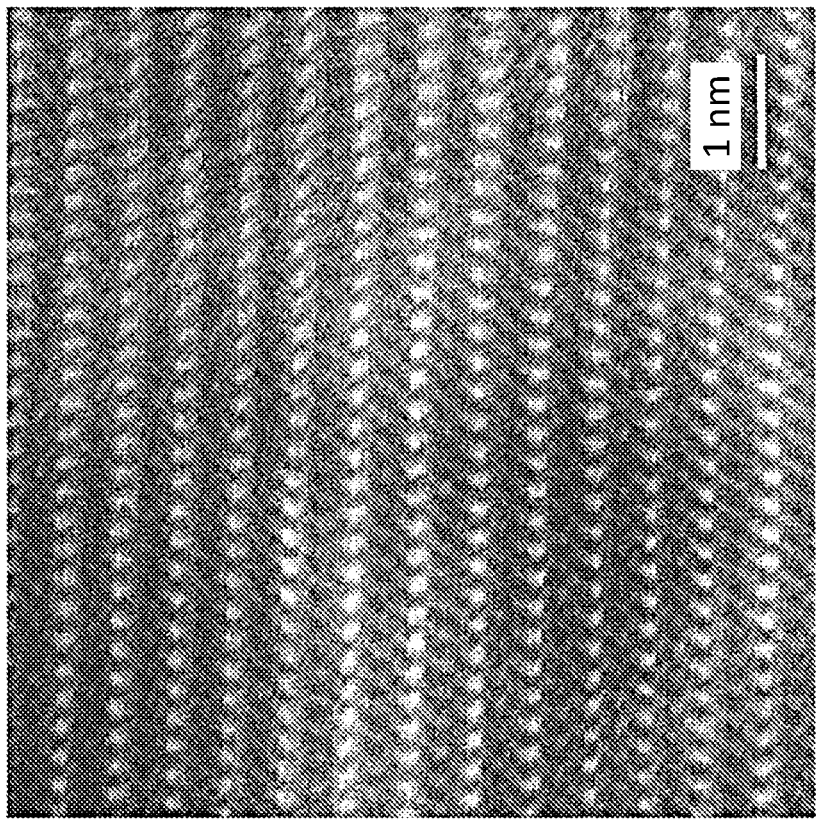
FIGS. 14A-14B show high resolution STEM LAADF images of a streak in the core of a $(NL)_{0.7}CO$ particle. The image shown in FIG. 14A corresponds to the STEM HAADF image shown in FIG. 3G. The image shown in FIG. 14B corresponds to the STEM HAADF image shown in FIG. 3H.
Figure 14A:
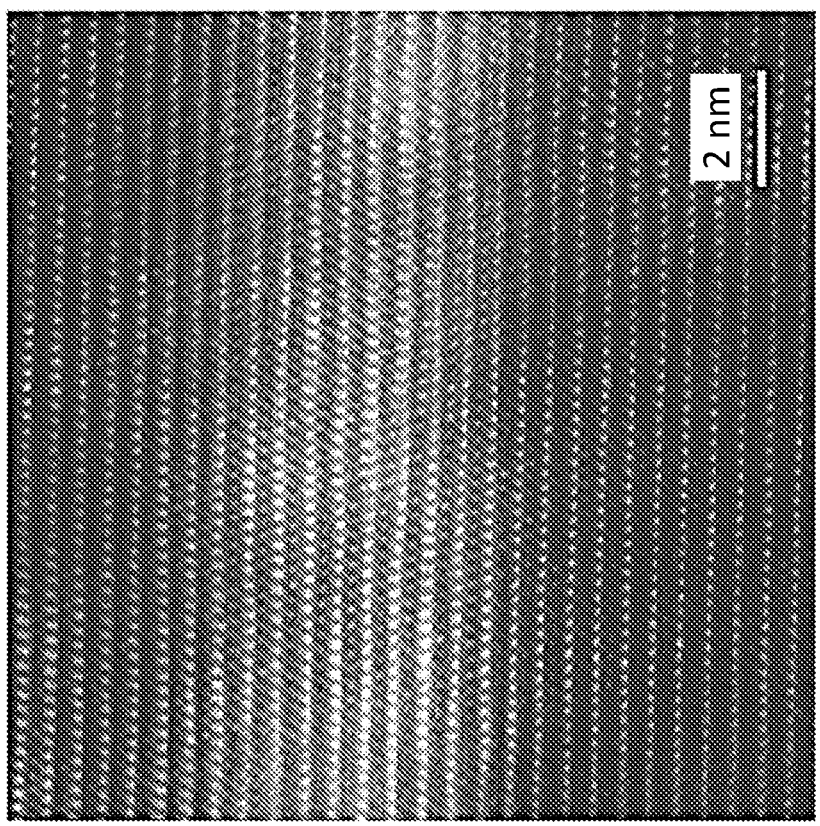

FIGS. 14A-14B show high resolution STEM LAADF images of a streak in the core of a $(NL)_{0.7}CO$ particle. The image shown in FIG. 14A corresponds to the STEM HAADF image shown in FIG. 3G. The image shown in FIG. 14B corresponds to the STEM HAADF image shown in FIG. 3H. The images show the diffraction contrast of a Na-containing streak in the Li-phase core. As evidenced in FIG. 3H, the layers that constitute the streak have layer spacings corresponding to the Na-phase, Li-phase, and intermediate phase.

Figure 15B:
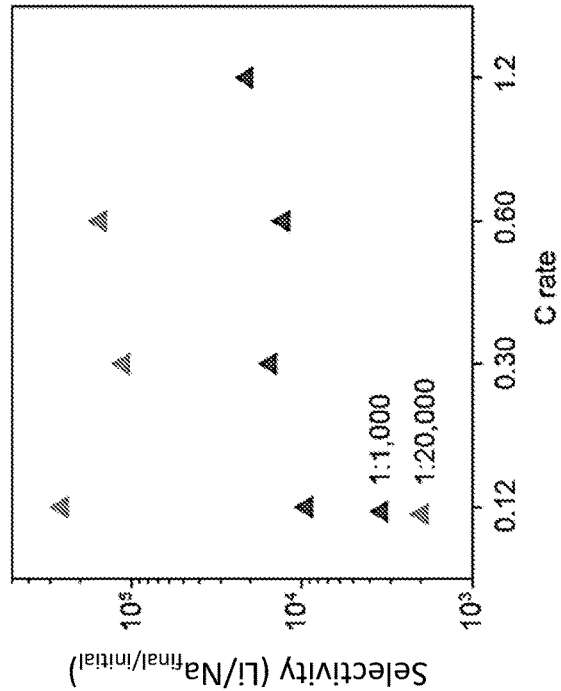
FIGS. 15A-15C show selectivity results for Li extraction. The selectivity results shown in FIG. 15A correspond to the data in FIGS. 4A and 4B. The selectivity results in FIG. 15B correspond to the data in FIGS. 4C and 4D.
Figure 15A:
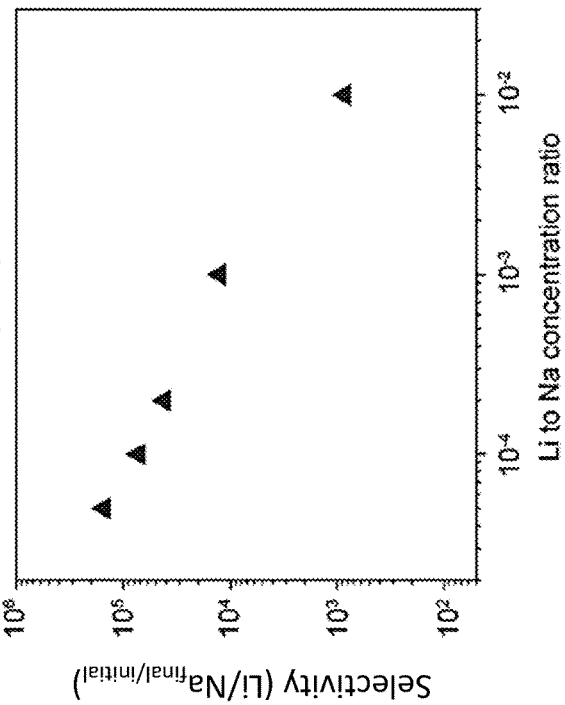
Figure 15C:
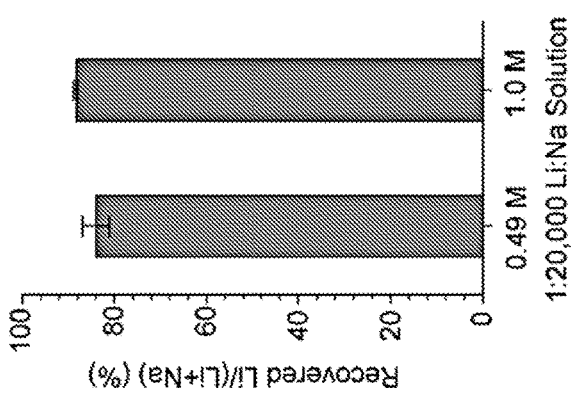

FIGS. 15A-15C show selectivity results for Li extraction. The selectivity results shown in FIG. 15A correspond to the data in FIGS. 4A and 4B. Selectivity is defined as the mol ratio of Li/Na measured in the recovery solution over the original Li/Na ratio in the Li$^+$ spiked solution. The selectivity results in FIG. 15B correspond to the data in FIGS. 4C and 4D. FIG. 15C shows the recovery of Li in 0.49 M and 1.0 M 1:20,000 Li:Na solution at a 0.60 C rate.

FIGS. 16A-16C show the poor intercalation capacity of the Li-rich phase. FIG. 16A shows the 1$^{st}$ intercalation of $Li_{0.94}CoO_2$ and $Li_{0.96}CoO_2$ at 0.03 C rate in 1:1,000 Li to Na aqueous solution. FIGS. 16B-16C show XRD patterns of the $(003)_{LCO-r}$ peak of $Li_{1-x}CoO_2$ after (FIG. 16B) delithiation in aqueous 1 M LiCl at 0.6 C rate with 2 hr rest and (FIG. 16C) 1$^{st}$ intercalation in 1:1,000 Li to Na aqueous solution at 0.03 C rate from FIG. 16A.

Figure 17B:
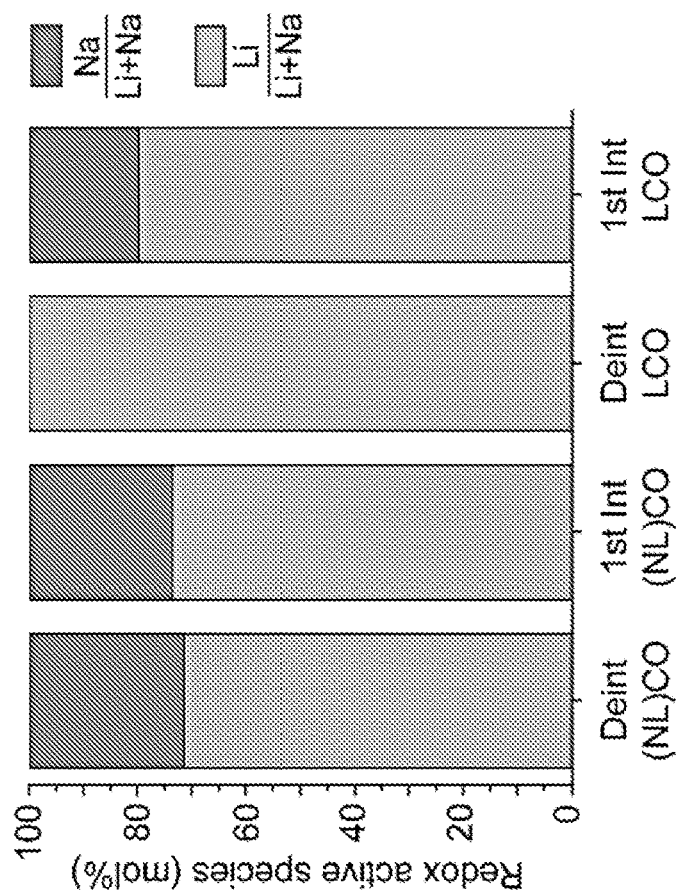
FIGS. 17A-17B show Li selectivity differences between $(NL)_{1-x}CO$ and $L_{1-x}CO$.
Figure 17A:
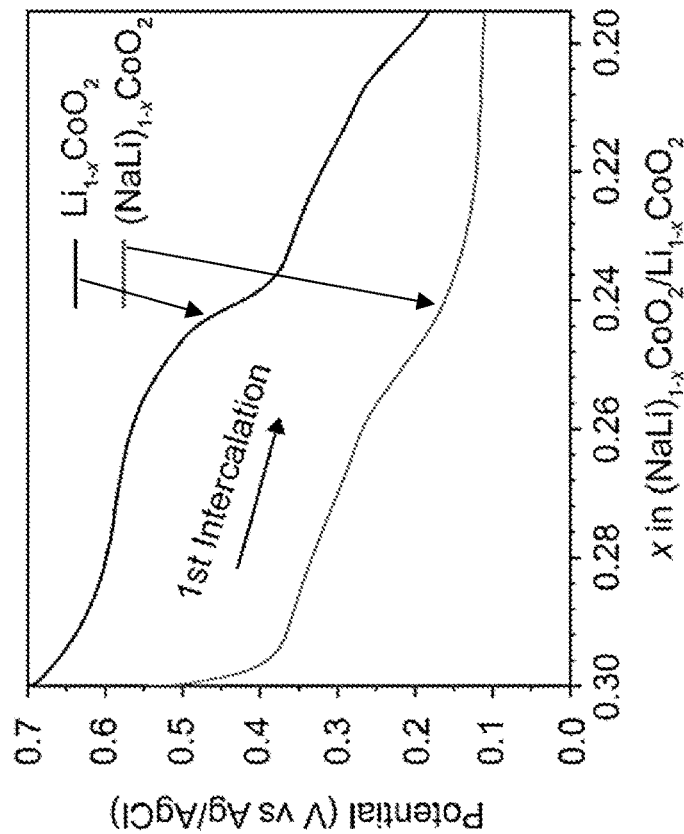

FIGS. 17A-17B show Li selectivity differences between $(NL)_{1-x}CO$ and $L_{1-x}CO$. FIG. 17A shows the 1$^{st}$ intercalation curve of $(NL)_{1-x}CO$ and $L_{1-x}CO$ in 1:1,000 Li to Na aqueous solution at a 0.6 C rate. The initial delithiation of LCO was performed in 1 M LiCl at a 0.6 C to form $L_{0.7}CO$. The $L_{0.7}CO$ was moved to the 1:1000 solution and the current started simultaneously. FIG. 17B shows the Li$^+$ and Na$^+$ ratios measured after dissolving the cathodes in stages: $(NL)_{1-x}CO$ after initial deintercalation, $(NL)_{1-x}CO$ 1$^{st}$ intercalation, $Li_{1-x}CO$ after initial deintercalation, and $Li_{1-x}CO$ 1$^{st}$ intercalation.

Figure 18:
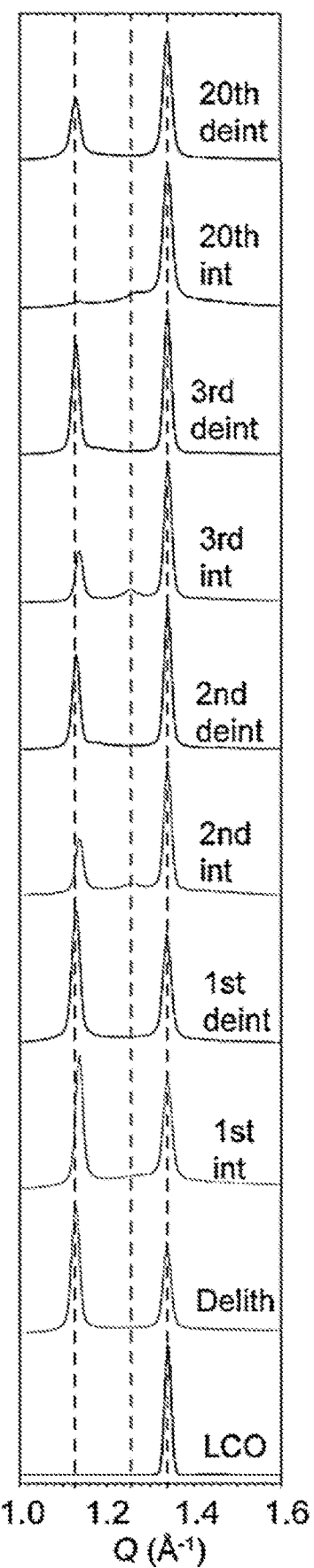
FIG. 18 shows a detailed view of an XRD spectrum upon cycling in Li to Na ratio 1:1,000 aqueous solution for Li recovery.

FIG. 18 shows a detailed view of an XRD spectrum upon cycling in Li to Na ratio 1:1,000 aqueous solution for Li recovery. This is the same XRD spectrum from FIG. 5D showing $(NaLi)_{1-x}CoO_2$ at end of intercalation x=0.195 and end of deintercalation x=0.300 at 0.6 C rate for 21 mins in Li to Na ratio 1:1,000 solution. The dashed lines mark the $(003)_{NCO-m}$ peak (left), intermediate peak (middle), and the $(003)_{LCO-r}$ peak (right).

Figure 19B:
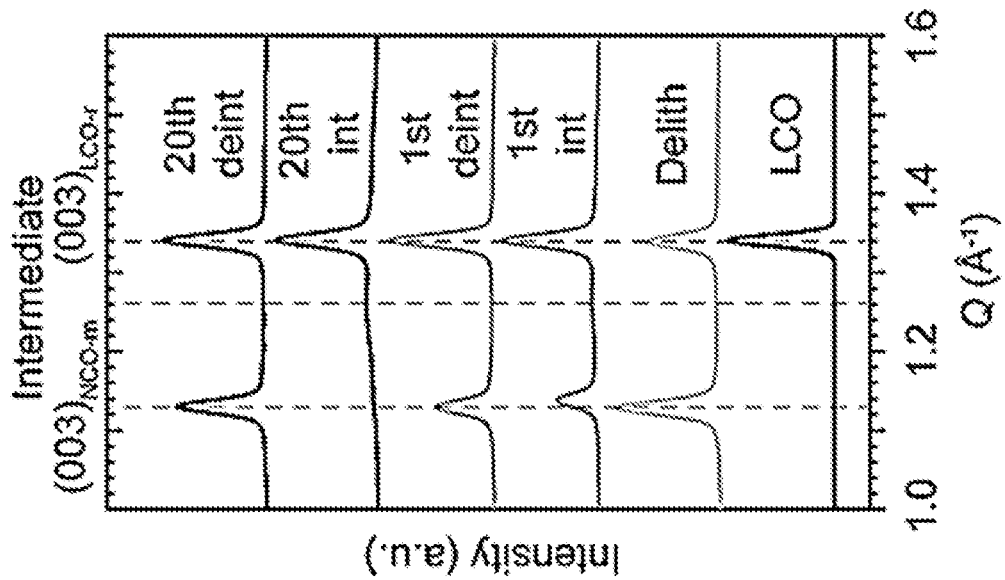
FIGS. 19A-19B show phase changes upon cycling in Li to Na ratio 1:20,000 aqueous solution for Li recovery.
Figure 19A:
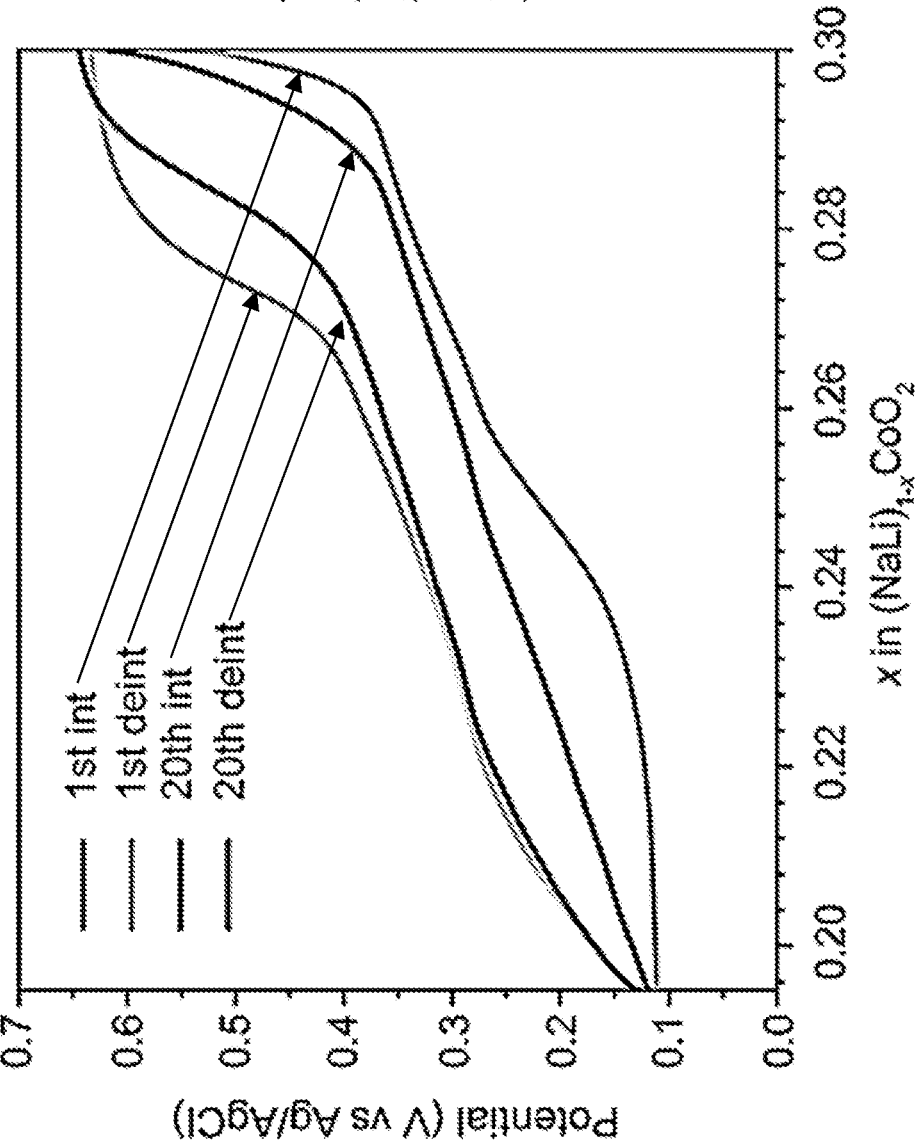

FIGS. 19A-19B show phase changes upon cycling in Li to Na ratio 1:20,000 aqueous solution for Li recovery. FIG. 19A shows constant current intercalation and deintercalation at 0.6 C rate for 21 mins in Li to Na ratio 1:20,000 solution. The x in $(NaLi)_{1-x}CoO_2$ ranges between 0.195 and 0.300. FIG. 19B shows the XRD spectrum for cycling with a detailed view of the $(003)_{NCO-m}$ (left), intermediate phase (middle), and $(003)_{LCO-r}$ (right) peaks.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the invention consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A layered Period Four transition metal oxide material comprising:
   a $Li_{0.94}MO_2$ phase, where M is Co, Mn, Ni, or a combination of two or more thereof;
   a $Na_xMO_2$ phase, where $0.45 \leq x \leq 0.51$ and M is Co, Mn, Ni, or a combination of two or more thereof, and
   a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase.

2. The layered Period Four transition metal oxide material of claim 1, having a core-shell structure in which the $Li_{0.94}MO_2$ phase is contained in a lithium-rich core and the $Na_xMO_2$ phase is contained in a sodium-rich shell at least partially surrounding the lithium-rich core.

3. The layered Period Four transition metal oxide material of claim 1, having a core-shell structure in which the $Na_xMO_2$ phase is contained in a sodium-rich core and the $Li_{0.94}MO_2$ phase is contained in a lithium-rich shell at least partially surrounding the lithium-rich core.

4. The layered Period Four transition metal oxide material of claim 1, wherein the $Li_{0.94}MO_2$ phase is a $Li_{0.94}CoO_2$ phase, and the $Na_xMO_2$ phase is an $Na_xCoO_2$ phase.

5. A method of forming a layered Period Four transition metal oxide material comprising:
   a $Li_{0.94}MO_2$ phase, where M is Co, Mn, Ni, or a combination of two or more thereof;
   a $Na_xMO_2$ phase, where $0.45 \leq x \leq 0.51$ and M is Co, Mn, Ni, or a combination of two or more thereof; and
   a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase, the method comprising:
   electrochemically delithiating $LiMO_2$, where M is Co, Mn, Ni, or a combination of two or more thereof, in an electrolyte solution to form a partially delithiated lithium Period Four transition metal oxide; and
   conducting a non-Faradaic cation-exchange on the partially delithiated lithium Period Four transition metal oxide in a solution containing dissolved sodium ions to form the layered Period Four transition metal oxide material.

6. The method of claim 5, wherein the partially delithiated lithium Period Four transition metal oxide is a partially delithiated lithium cobalt oxide.

7. A method of forming a layered Period Four transition metal oxide material comprising:
   a $Li_{0.94}MO_2$ phase, where M is Co, Mn, Ni, or a combination of two or more thereof;
   a $Na_xMO_2$ phase, where $0.45 \leq x \leq 0.51$ and M is Co, Mn, Ni, or a combination of two or more thereof; and
   a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase, the method comprising:
   conducting a non-Faradaic cation-exchange on $Na_yMO_2$, where M is Co, Mn, Ni, or a combination thereof and $0.5 \leq y < 1$, in a solution containing dissolved lithium ions to form the layered Period Four transition metal oxide material.

8. The method of claim 7, wherein the $Na_yMO_2$ is $Na_{0.67}CoO_2$.

9. An electrochemical cell for the extraction of lithium ions from a solution comprising lithium ions, the electrochemical cell comprising:
   a cell compartment;
   a lithium storage electrode in the cell compartment, the lithium storage electrode comprising a layered Period Four transition metal oxide material comprising:
      a $Li_{0.94}MO_2$ phase, where M is Co, Mn, Ni, or a combination of two or more thereof;
      a $Na_xMO_2$ phase, where $0.45 \leq x \leq 0.51$ and M is Co, Mn, Ni, or a combination of two or more thereof; and
      a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase; and
   a counter electrode in the cell compartment, wherein the counter electrode is in electrical communication with the lithium storage electrode.

10. The electrochemical cell of claim 9, wherein the counter electrode comprises a sodiated material.

11. The electrochemical cell of claim 10, wherein the sodiated material comprises $NaFePO_4$.

12. A method of extracting lithium from an electrolyte solution containing dissolved lithium ions using an electrochemical cell comprising:
   a cell compartment;
   a lithium storage electrode in the cell compartment, the lithium storage electrode comprising a layered Period Four transition metal oxide material comprising:
      a $Li_{0.94}MO_2$ phase, where M is Co, Mn, Ni, or a combination of two or more thereof;
      a $Na_xMO_2$ phase, where $0.45 \leq x \leq 0.51$ and M is Co, Mn, Ni, or a combination of two or more thereof; and
      a transition region between the $Li_{0.94}MO_2$ phase and the $Na_xMO_2$ phase, the transition region comprising a Period Four transition metal oxide phase having a layer spacing that is intermediate between a layer spacing of the $Li_{0.94}MO_2$ phase and a layer spacing of the $Na_xMO_2$ phase; and
   a counter electrode in the cell compartment, wherein the counter electrode is in electrical communication with the lithium storage electrode, the method comprising:
   introducing an electrolyte solution comprising dissolved lithium ions into the cell compartment; and
   applying a bias voltage across the lithium storage electrode and the counter electrode, wherein the application of the bias voltage drives the intercalation of lithium ions from the electrolyte solution into the layered Period Four transition metal oxide material.

13. The method of claim 12, further comprising:
   replacing the electrolyte solution with a lithium recovery solution;
   replacing the counter electrode with a second counter electrode; and
   applying a reverse bias voltage across the lithium storage electrode and the second counter electrode, wherein the application of the reverse bias voltage drives the deintercalation of lithium ions from the layered Period Four transition metal oxide material into the lithium recovery solution to recover the lithium.

14. The method of claim 13, wherein the electrolyte solution further comprises dissolved sodium ions, and the lithium ions are recovered with a selectivity of at least $1 \times 10^4$.

15. The method of claim 13, wherein the electrolyte solution further comprises dissolved sodium ions, and the lithium ions are recovered with a selectivity of at least $1 \times 10^5$.

16. The method of claim 13, further comprising removing the lithium ions from the lithium recovery solution.

17. The method of claim 13, wherein the electrolyte solution comprises seawater.

* * * * *